(12) United States Patent
Harif

(10) Patent No.: US 9,156,095 B2
(45) Date of Patent: Oct. 13, 2015

(54) CUTTING TOOL, CUTTING TOOL HOLDER, AND A CUTTING INSERT THEREFOR

(75) Inventor: Gershon Harif, Ramat Gan (IL)

(73) Assignee: NO SCREW LTD., Holon (IL)

( * ) Notice: Subject to any disclaimer, the term of this patent is extended or adjusted under 35 U.S.C. 154(b) by 597 days.

(21) Appl. No.: 13/508,706

(22) PCT Filed: Nov. 9, 2010

(86) PCT No.: PCT/IL2010/000927
§ 371 (c)(1),
(2), (4) Date: May 8, 2012

(87) PCT Pub. No.: WO2011/055372
PCT Pub. Date: May 12, 2011

(65) Prior Publication Data
US 2012/0230787 A1    Sep. 13, 2012

Related U.S. Application Data

(60) Provisional application No. 61/259,374, filed on Nov. 9, 2009.

(51) Int. Cl.
*B23B 51/02* (2006.01)

(52) U.S. Cl.
CPC ............. *B23B 51/02* (2013.01); *B23B 2240/04* (2013.01); *B23B 2251/02* (2013.01); *B23B 2251/50* (2013.01); *Y10T 407/23* (2015.01);
(Continued)

(58) Field of Classification Search
CPC .................... B23B 2251/02; B23B 2251/50
USPC ................... 408/230–233, 226, 227
See application file for complete search history.

(56) References Cited

U.S. PATENT DOCUMENTS

| 2,526,998 | A |  | 10/1950 | Davis |
| 3,380,746 | A |  | 4/1968 | Benjamin et al. |
| 5,971,673 | A | * | 10/1999 | Berglund et al. ............. 408/1 R |

(Continued)

FOREIGN PATENT DOCUMENTS

| DE | 102009044994 A1 * | 9/2010 | ............. B23B 51/02 |
| EP | 0118806 | 9/1984 | |

(Continued)

OTHER PUBLICATIONS

International Search Report from International Application No. PCT/IL2010/000927 dated Jun. 29, 2011.

*Primary Examiner* — Daniel Howell
*Assistant Examiner* — Ryan Rufo
(74) *Attorney, Agent, or Firm* — Dorsey & Whitney LLP

(57) ABSTRACT

A cutting tool holder configured for mounting a cutting insert to form a cutting tool that extends along a central axis and comprises a mounting portion having a seat surface oriented generally perpendicular to the central axis. The tool holder has at least two securing extensions projecting from the seat surface in a direction generally parallel to the central axis. Each of the extensions are formed, at an end remote from the seat surface with a latch portion extending towards the central axis. The latch portion has an under and top surface, both oriented generally transversely to the central axis such that the under surface is disposed between the seat surface and the top surface. Each of the extensions is formed with a side surface extending between the under and side surfaces to form a securing pocket defined between the seat, side, and under surfaces.

19 Claims, 18 Drawing Sheets

(52) U.S. Cl.
CPC ........ *Y10T408/892* (2015.01); *Y10T 408/9098* (2015.01); *Y10T 408/95* (2015.01)

(56) References Cited

U.S. PATENT DOCUMENTS

| | | | |
|---|---|---|---|
| 6,582,164 B1* | 6/2003 | McCormick | 408/226 |
| 2008/0193237 A1* | 8/2008 | Men et al. | 408/226 |
| 2009/0092451 A1 | 4/2009 | Harif | |
| 2009/0116920 A1* | 5/2009 | Bae | 408/227 |
| 2009/0311060 A1* | 12/2009 | Frejd | 408/200 |
| 2010/0143059 A1* | 6/2010 | Hecht | 408/200 |

FOREIGN PATENT DOCUMENTS

| | | | | |
|---|---|---|---|---|
| JP | 2005-169542 A * | 6/2005 | ............ | B23B 51/00 |
| WO | WO 98/53943 | 12/1998 | | |
| WO | WO 2005/102573 | 11/2005 | | |
| WO | WO 2008014367 A1 * | 1/2008 | ............ | B23B 51/02 |
| WO | WO 2008/099379 | 8/2008 | | |

* cited by examiner

CUTTING TOOL, CUTTING TOOL HOLDER, AND A CUTTING INSERT THEREFOR

FIELD OF THE INVENTION

This invention relates to cutting inserts, in particular to arrangements adapted for mounting and securing the cutting insert onto a cutting tool holder.

BACKGROUND OF THE INVENTION

Cutting tools are generally used for removing material from a workpiece, using a cutting edge of the tool. There is a great plurality of cutting tools, each configured for performing a different cutting operation, i.e. Removing material from the workpiece in a specific manner. Examples of such operations are milling, turning, wedging, drilling etc., and each cutting tool and it corresponding cutting edge designed so as to perform their respective operation.

Cutting tools can generally divided into two types: integral cutting tools and combined cutting tools, where the former has an integral cutting edge formed in the tool itself, while the latter comprises a cutting tool holder and a cutting insert formed with a cutting edge, the insert being configured for mounting onto the cutting tool holder.

There are various mechanisms and manners in which a cutting insert can be mounted onto the cutting tool holder, including fastening screws, securing pins, snap fittings and bayonets.

With particular reference to drilling tools, the bayonet arrangement is widely used for mounting a drilling head onto the cutting tool holder. Specifically, the drill head (formed with a cutting edge/s) is formed with a latch portion and the cutting tool holder is formed with a corresponding recess, configured for receiving the latch portion. The arrangement is such that during operation of the drilling tools, revolution of the drilling tool operates against the bayonet, tightening the secure engagement between the cutting tool holder and the drill head.

SUMMARY OF THE INVENTION

According to the subject matter disclosed in the present application there is provided a cutting tool holder configured for mounting thereon a cutting insert to form a cutting tool, said tool holder extending along a central axis and comprising a mounting portion having a seat surface oriented generally perpendicular to the central axis and at least two securing extensions projecting from the seat surface in a direction generally parallel to that of said central axis, each of said extensions being formed, at an end remote from said seat surface with a latch portion extending towards said central axis, said latch portion having an under surface and a top surface, both oriented generally transversely to said central axis such that said under surface is disposed between said seat surface and said top surface, each of said extensions being further formed with a side surface extending between said under surface and said seat surface to form a securing pocket defined between the seat surface, the side surface and the under surface, configured for receiving therein a portion of said cutting insert, wherein said under surface is oriented parallel to said seat surface and said top surface is oriented at an angle to said side surface other than 90 deg.

More specifically, at least one of the seat surface and the under surface can be oriented at a generally right angle to said side surface. According to a specific design, both said seat surface and said under surface are oriented at a generally right angle to said side surface. In addition, the design of the tool holder can be such that the area of said top surface is considerably greater than the area of said under surface.

The latch portion can be further formed with an auxiliary side surface extending between said under surface and said top surface. According to a specific example, the auxiliary side surface is oriented generally parallel to said side surface.

The cutting insert also extends along a central axis and comprises a mounting portion having an insert under surface oriented generally transversly to the central axis and at least two securing extensions projecting from the insert under surface in a direction generally parallel to that of said central axis, each of said extensions being formed, at an end remote from said insert under surface with a bayonet portion extending towards said central axis, said bayonet portion having a bayonet top surface and a bayonet bottom surface, both oriented generally transversely to said central axis such that said bayonet top surface is disposed between said bayonet bottom surface and said insert under surface, each of said extensions being further formed with a bayonet insert side surface extending between said insert under surface and said bayonet top surface to form a securing pocket defined between the insert under surface, the side surface and the bayonet top surface, configured for receiving therein a latch portion of said cutting tool holder, wherein said bayonet top surface is oriented parallel to said bayonet bottom surface and said insert under surface is oriented at an angle to said side surface other than 90 deg.

The arrangement is such that surfaces of the mounting portions and bayonet portions of the cutting insert correspond in orientation to the surfaces of the mounting portions and latch portions of said tool holder, as follows:

Bayonet bottom surface—oriented correspondingly to said seat surface;
Bayonet side surface—oriented correspondingly to said side surface;
Bayonet top surface—oriented correspondingly to said under surface;
Insert side surface—oriented correspondingly to said auxiliary side surface; and
Insert under surface—oriented correspondingly to said top surface;

The arrangement is such that when said cutting insert is mounted onto said cutting tool holder (i.e. in a mounting position), and said bayonet portions are received within said pockets, the contact between the cutting insert and the cutting tool holder is provided only through the insert under surface and bayonet top surface abutting the corresponding under surface and top surface of the cutting tool holder. It should be noted that under this arrangement, the insert side surface, bayonet side surface and bayonet bottom surface are all out of contact with said cutting tool holder.

One advantage that may arise from this design is that there is formed a gap between the seat surface of the holder and the bayonet bottom surface, allowing cooling fluid to flow therethrough, thereby increasing the cooling efficiency of the cutting insert.

Under the above suggested design, the majority of the contact between the cutting insert and the cutting tool holder in the area of the latch/bayonet takes place along the top surface, i.e. the top surface of the latch portion supports the majority of the loads applied during operation of the cutting tool, thereby providing a more robust construction of the tool holder, which, inter alia, prolongs the life span of the cutting tool holder (can be used for a longer period of time before wearing out).

In addition, under the above design, the latch portion of the tool holder is urged into the pocket of the insert in such a way that the forces applied to the insert by the holder attempt to 'widen' the pocket, i.e. push apart the insert under surface from the bayonet top surface. Correspondingly, the bayonet portion of the cutting insert presses on the latch portion in opposite directions, attempting to press on the top surface and under surface of the latch portion in opposite directions.

In this manner, there is greatly reduced, if not at all eliminated, a force applied by the cutting insert on the cutting tool holder attempting to 'widen' the pocket of the latch portion, i.e. separating apart the under surface from the seat surface. Thus, the latch portion is subjected to lesser loads, increasing its life span.

The cutting tool holder can further be formed with a securing port, configured for receiving therein at least a part of a securing mechanism configured for securing the cutting insert onto the cutting tool holder, when the former is mounted onto the latter. Correspondingly, the cutting insert can also be formed with a securing port configured for receiving a portion of the same securing mechanism so as to provide secure engagement between the insert and the tool holder.

The securing mechanism can be configured for applying a force to the cutting insert urging it into the mounting position, i.e. pressing it against the cutting tool holder. More particularly, the above force can be configured for tightening the contact between the corresponding surfaces of the cutting tool holder and of the cutting insert, i.e. between the insert under surface and the latch top surface, and between the insert top surface and the latch under surface.

Examples of such securing mechanism can be a screw mechanism, a clamping mechanism, a lever mechanism, a snap mechanism or a 'no-screw' mechanism similar to that disclosed in U.S. patent application Ser. No. 12/314,428 to the applicant, which is incorporated herein by reference, in particular, the portions of the specification of the above application pertaining to FIGS. 2A to 44, FIGS. 47 to 49C and FIGS. 59A to 66B therein.

According to one design example, the securing port of the cutting tool holder can be formed within the seat surface thereof, so that the force applied by the securing mechanism in the mounting position of the cutting insert maintains the insert secured by pushing the bayonet portion thereof against the latch portion of the cutting tool holder. Under this arrangement, the bayonet portion of the cutting insert is disposed between the latch portion of the cutting tool holder and the securing mechanism.

According to another design example, the securing port of the cutting tool holder can be formed within the top surface thereof, so that the force applied by the securing mechanism in the mounting position of the cutting insert maintains the insert secured by pulling the bayonet portion thereof towards the latch portion of the cutting tool holder. Under this arrangement, the latch portion of the cutting tool holder is disposed between the bayonet portion of the cutting insert and the securing mechanism.

The cutting tool constituted by the cutting tool holder, cutting insert and securing mechanism can be configured for a plurality of cutting operations, for example, drilling. Thus, the cutting tool holder can be a drill holder and the cutting insert can be a drill-head.

With reference to the above, the drilling tool is configured for revolving about the central axis thereof during a drilling operation. The arrangement is such that revolution of the drilling tool further secures the drill-head in its mounting position on the drill holder. More particularly, the design is such that when the drill-head is mounted onto the drill holder, the bayonet side surface is located in front of the side surface with respect to the direction of revolution of the drilling tool.

According to still another aspect of the subject matter of the present application, there is provided a cutting tool holder configured for mounting thereon a cutting insert to form a cutting tool, said cutting tool holder extending along a central axis and comprising a mounting portion having a seat surface oriented generally perpendicular to the central axis and at least two securing extensions extending in a direction generally parallel to that of said central axis, each of said extensions being formed, at an end remote from said seat surface with a latch portion extending towards said central axis, said latch portion having an under surface and a top surface, both oriented generally transversely to said central axis such that said under surface is disposed between said seat surface and said top surface, each of said extensions being further formed with a side surface extending between said under surface and said seat surface, such that there is formed a securing pocket defined between the seat surface, side surface and under surface, configured for receiving therein a portion of said cutting insert, wherein said top surface is formed with a securing port configured for receiving therein at least a part of a securing mechanism used for securing the cutting insert onto the cutting tool holder when the former is mounted onto the latter.

According to one example, the securing port of the cutting tool holder can be angularly shifted about the central axis with respect to the pocket of the mounting portion of the cutting tool holder. In other words, the securing port is not located directly axially above the pocket. Under this arrangement, the securing port can be entirely formed in the extension, rather than in the latch portion of the mounting portion. In addition, the design is such that the securing port is disposed behind the latch portion with respect to the revolution direction of the cutting tool in which the cutting tool holder is used.

According to yet another aspect of the subject matter of the present application, there is provided a drill-head configured for mounting onto the cutting tool holder of the previous aspect of the subject matter of the present application, said drill-head having a central axis being formed with a bayonet portion configured for being received within the pocket of the mounting portion of said cutting tool holder, said cutting insert further having a top surface formed with an insert securing port configured for receiving therein at least a portion of a securing mechanism, wherein said securing port is angularly shifted about the central axis with respect to the bayonet portion of the drill-head.

According to a further aspect of the disclosed subject matter of the present patent application there is provided a method for mounting and securing a cutting insert onto a cutting tool holder, said cutting tool holder comprising an insert seat having a seat surface adapted for engagement with a corresponding insert surface, said seat surface being formed with at least one pocket designed for receiving therein a securing pin an having a central axis, said pin being biased by a biasing mechanism and is adapted to assume a first, mounting position in which said securing pin protrudes to a first extent from said seat surface along said axis, and in which a cutting insert can be mounted onto the cutting tool holder, and a second, securing position in which said securing pin protrudes to a second extent from said seat surface along said axis, which is greater than said first extent, said securing pin further being formed with an insert engagement surface at an end thereof protruding from said pocket and said cutting insert is formed with a pin engagement surface, said method including:

bringing said cutting insert and said securing pin in contact with one another when the securing pin is in said securing position;

Displacing said securing pin into said mounting position using said cutting insert; and displacing said cutting insert with respect to said cutting tool holder into a secured position thereof, said displacement having at least one component in a direction parallel to said seat surface, allowing said securing pin to displace back into said securing position.

The arrangement can be such that during said displacement, a composite force is applied to said securing pin, said composite force having a first force component in the direction of said axis and a second force component in a direction transverse to said axis, whereby, due to said angle, said first force component is greater than said second force component, thereby causing said securing pin to displace from said securing position to said mounting position thereof, and allowing bringing the cutting insert into a secured position thereof by a single unidirectional motion.

According to still another aspect of the disclosed subject matter of the present patent application there is provided a cutting tool holder adapted for mounting a cutting insert thereto, said cutting tool holder comprising an insert seat having a seat surface adapted for engagement with a corresponding insert surface, said seat surface being formed with at least one pocket designed for receiving therein a securing pin an having a central axis, said pin being biased by a biasing mechanism and is adapted to assume a first, mounting position in which said securing pin protrudes to a first extent from said seat surface along said axis, and in which a cutting insert can be mounted onto the cutting tool holder, and a second, securing position in which said securing pin protrudes to a second extent from said seat surface along said axis, which is greater than said first extent, said securing pin further being formed with an insert engagement surface at an end thereof protruding from said pocket and said cutting insert is formed with a pin engagement surface, wherein the insert engagement surface of the securing pin is formed at an angle to said seat surface.

According to yet another aspect of the disclosed subject matter of the present patent application there is provided a cutting insert for mounting onto a cutting tool holder, said cutting tool holder comprising an insert seat having a seat surface adapted for engagement with a corresponding insert surface, said seat surface being formed with at least one pocket designed for receiving therein a securing pin an having a central axis, said pin being biased by a biasing mechanism and is adapted to assume a first, mounting position in which said securing pin protrudes to a first extent from said seat surface along said axis, and in which a cutting insert can be mounted onto the cutting tool holder, and a second, securing position in which said securing pin protrudes to a second extent from said seat surface along said axis, which is greater than said first extent, said securing pin further being formed with an insert engagement surface at an end thereof protruding from said pocket and said cutting insert is formed with a pin engagement surface, wherein the pin engagement surface of the cutting insert is designed such that, when the cutting insert is mounting onto said cutting tool holder, said pin engagement surface is at an angle to said seat surface.

BRIEF DESCRIPTION OF THE DRAWINGS

In order to understand the invention and to see how it can be carried out in practice, embodiments will now be described, by way of non-limiting example only, with reference to the accompanying drawings, in which.

DETAILED DESCRIPTION OF EMBODIMENTS

Figure 1:
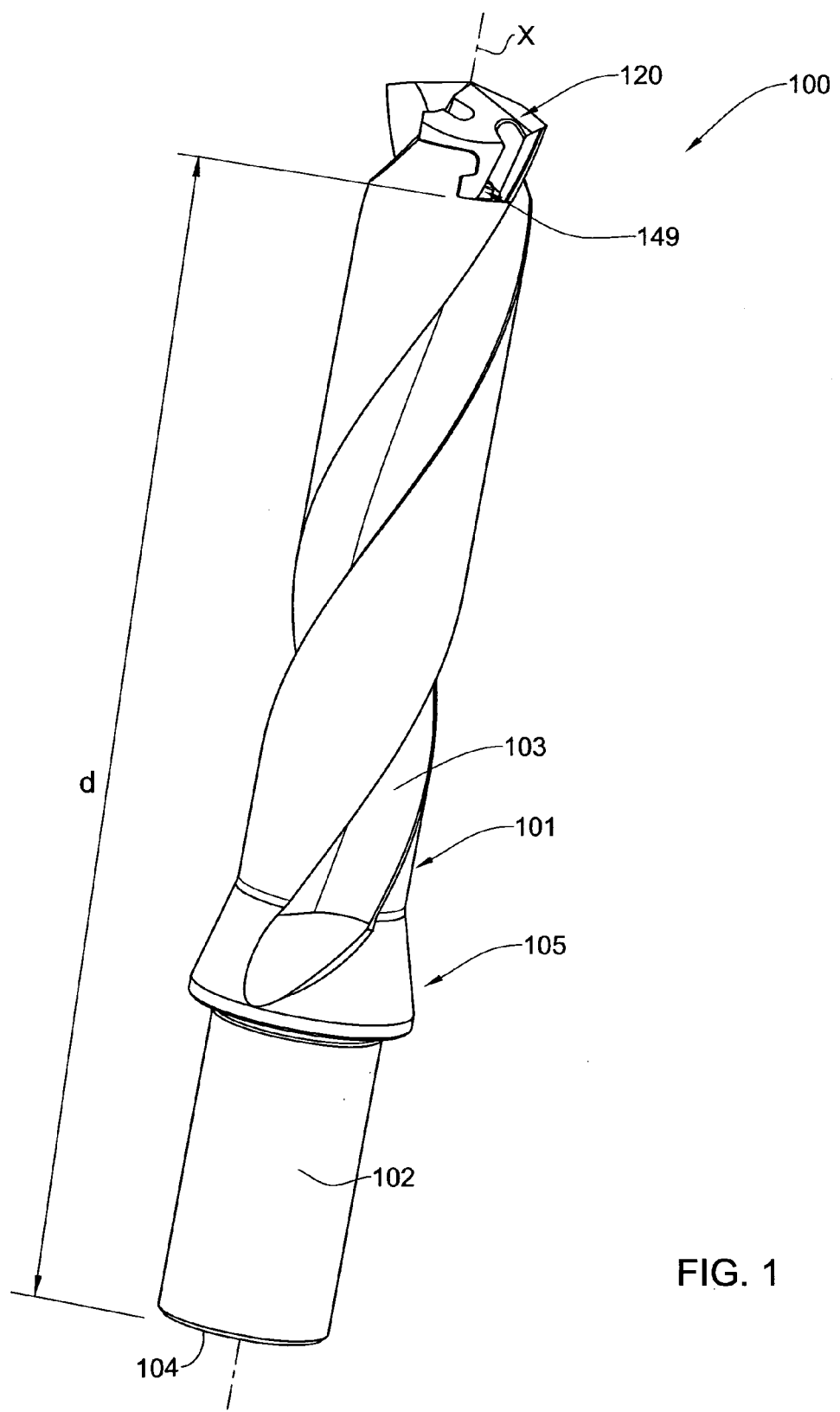
FIG. 1 is a schematic perspective view of a cutting tool assembly known from prior art.

With Reference to FIG. 1, a cutting tool in the form of a drilling tool is shown generally designated 100 comprising a cutting tool holder 105 and a cutting insert 120 secured thereon by a securing mechanism 149.

The cutting tool holder 105 comprises a body 101 extending along a central axis 160, and formed with:
- a mounting portion 105' at a distal end thereof, adapted for properly securing the cutting insert 120. It is noted that the mounting portion is of a design known from prior art;
- a Chip evacuation channel 103 adapted for evacuating chips removed from a workpiece during operation of the cutting tool; and
- a shank portion 102 adapted to be received by a driving unit (not shown), the shank portion having a bottom surface 104 at the proximal end of the body 101.

Figure 2A:
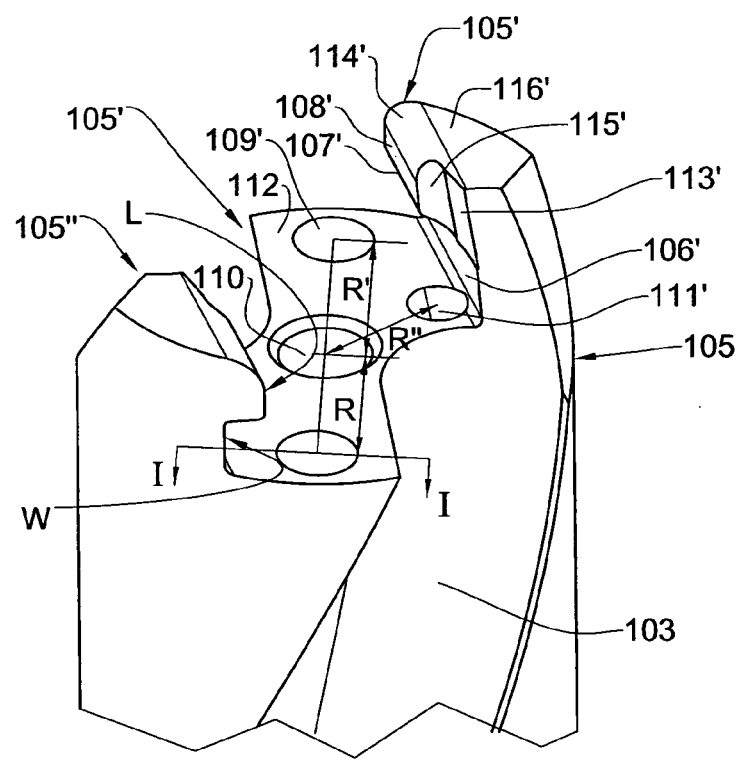
FIG. 2A is a schematic top view of a tool holder shown in FIG. 1.
Figure 2B:
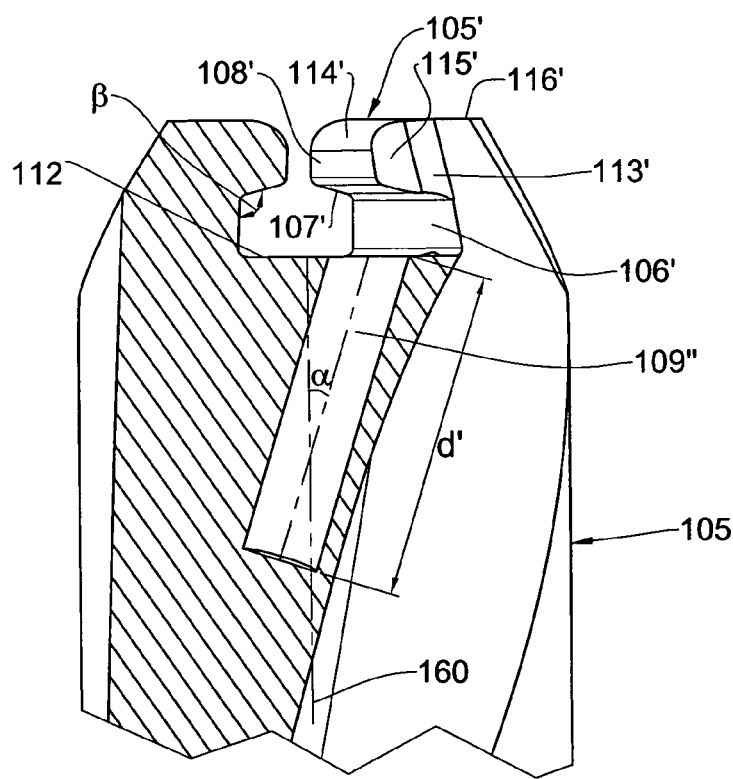
FIG. 2B is schematic a cross-sectional view of the tool holder taken along line I-I lying on a plane parallel to the central axis of the cutting tool and at a distance R from the central axis, shown in FIG. 2A.

With reference to FIGS. 1, 2A and 2B, the mounting portion 105' is formed with an insert seat surface 112 and securing extensions 105".

Figure 3A:
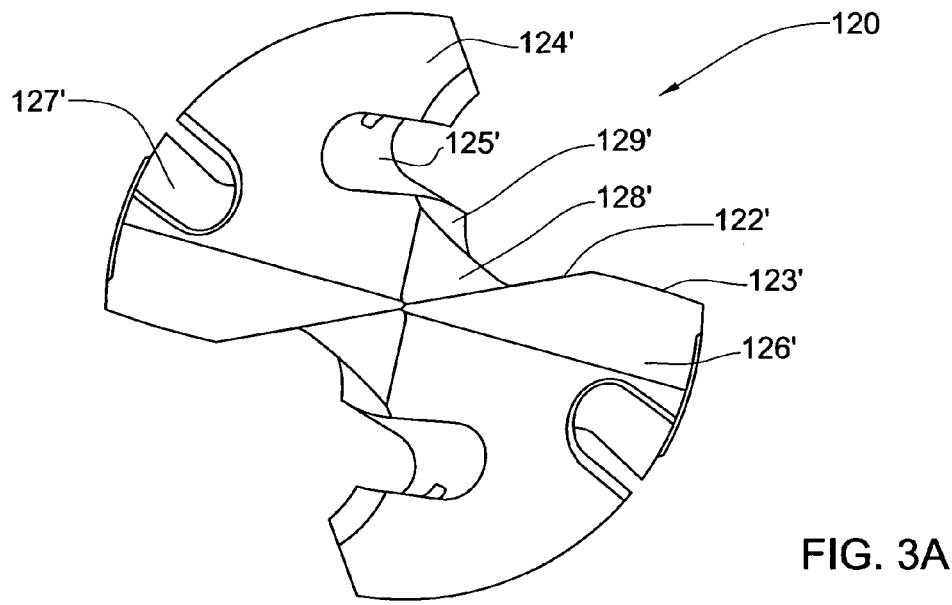
FIG. 3A is a schematic top view of an insert used in the cutting tool shown in FIG. 1.
Figure 3C:
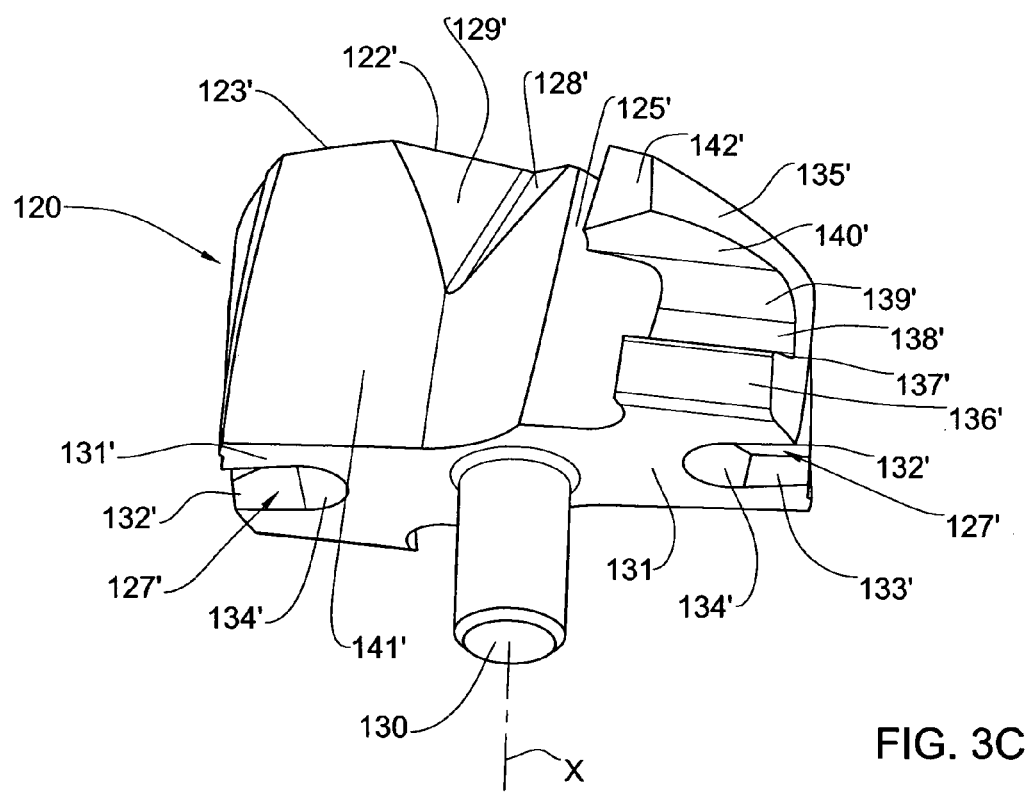
FIG. 3C is schematic a perspective bottom view of the cutting insert shown in FIG. 3A.
Figure 3B:
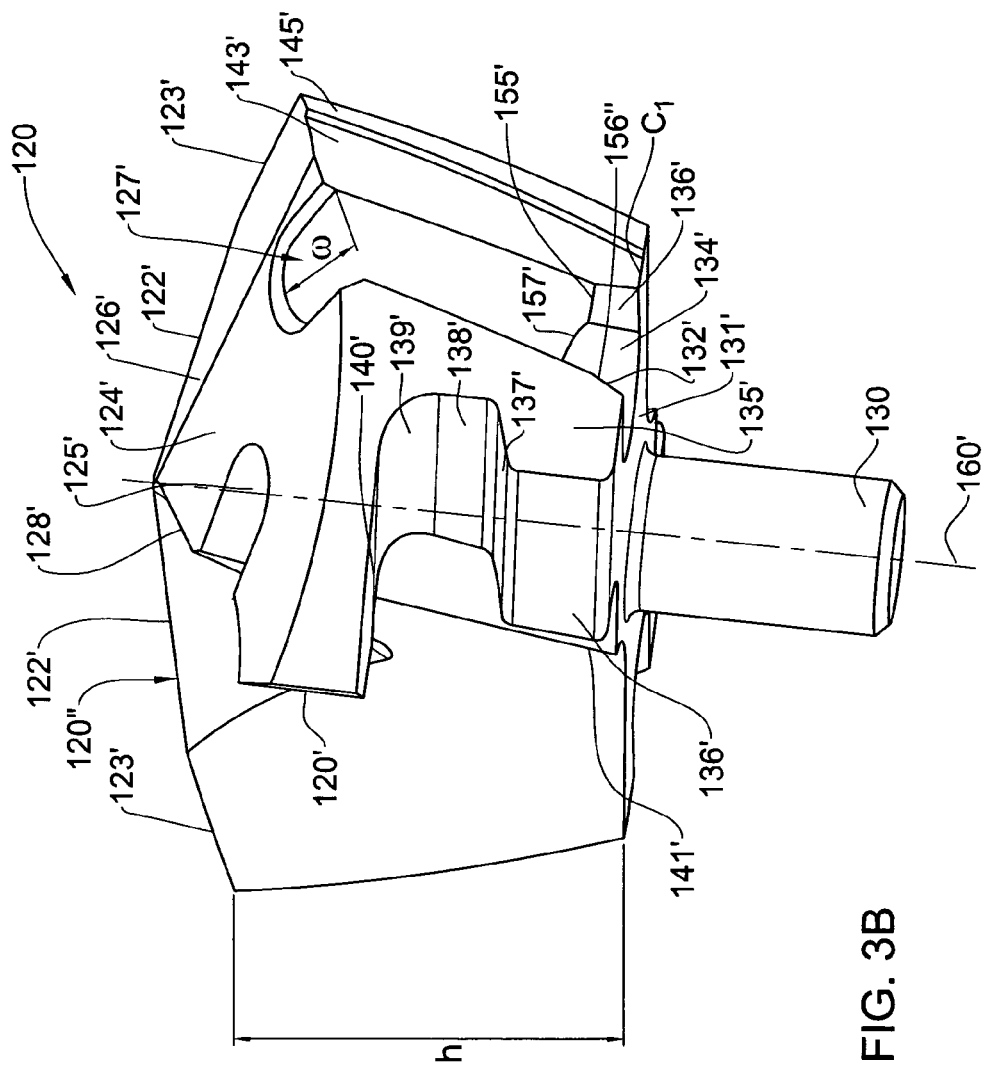
FIG. 3B is schematic perspective view of the cutting insert shown in FIG. 3A.

The insert seat surface 112 is adapted to engage a corresponding surface of the cutting insert 120, and is oriented generally perpendicular to the central axis 160 and parallel to a bottom surface 104 at a distance d therefrom and contains:
- an insert alignment hole 110 extending along the axis of rotation 160;
- Two pin holes 109', adapted for receiving corresponding securing pins of the securing mechanism 149, extending at an acute angle α to the central axis 160, having a depth d' and located opposite each other along a circumference of a circle of radius R', measured from the midpoint of securing hole 110;
- Cooling liquid channels 111', adapted for passage of cooling liquid there through such that the cutting tool 100 is protected from overheating during operation, extending at an acute angle (not shown), to the axis of rotation to depth d and located opposite each other along a circumference of a circle of radius R", measured from the midpoint of securing hole 110;

The two securing extensions 105" are interfaced with and are designed so as to secure the cutting insert 120 to the tool holder 105. The extensions are dimensionally identical and are located opposite each other, each being formed with a wall portion W and a latch portion L, adapted for engaging the cutting insert 120 when mounted onto the cutting tool holder 105. The wall portion W and latch portion L are defined by the following surfaces:
- a first alignment surfaces 106', designed for interfacing with corresponding surfaces contained in insert 120 and aiding in the assembly thereof to tool holder 105, extending from the seat surface 112, oriented parallel and opposite to each other, and perpendicular to the insert seat surface 112, at an equal distance from the axis of rotation 160;
- Contact surfaces 107', designed for mating with corresponding surfaces contained in insert 120 in order to secure cutting insert 120, extending from alignment surfaces 106', and at an oblique angle thereto;
- Second alignment surfaces 108', designed for interfacing with corresponding surfaces contained in insert 120 and aiding in the assembly thereof to tool holder 105, located parallel and opposite to each other, extending perpendicularly from or at an oblique angle to, contact surfaces 107', and at an equal distance from the axis of rotation 160;
- surfaces 114' extending from surfaces 108', and merging with cutting tool holder 105 upper surfaces 116' which are parallel to insert seat surface 112;
- Extension surfaces 115', designed for providing the cutting insert 120 with access to the cooling liquid channels 111', aligned to but not in contact with the circumferential surfaces of cooling liquid channels 111', are defined by and intersect surfaces 107', 108', 114' respectively, and are in the form of a curve having a radius matching that of cooling liquid channels 111'; and
- Surfaces 113', designed for guiding the cutting insert 120 into the mounted position during assembly, extending from surfaces 115' and intersect with the chip evacuation channel 103;

With reference to FIGS. 3A, 3B and 3C, the cutting insert generally designated 120 is shown comprising a mounting portion 120' adapted for mounting the cutting insert onto the cutting tool holder, and a cutting portion 120" adapted for removing material from a workpiece during operation of the cutting tool.

Figure 4A:
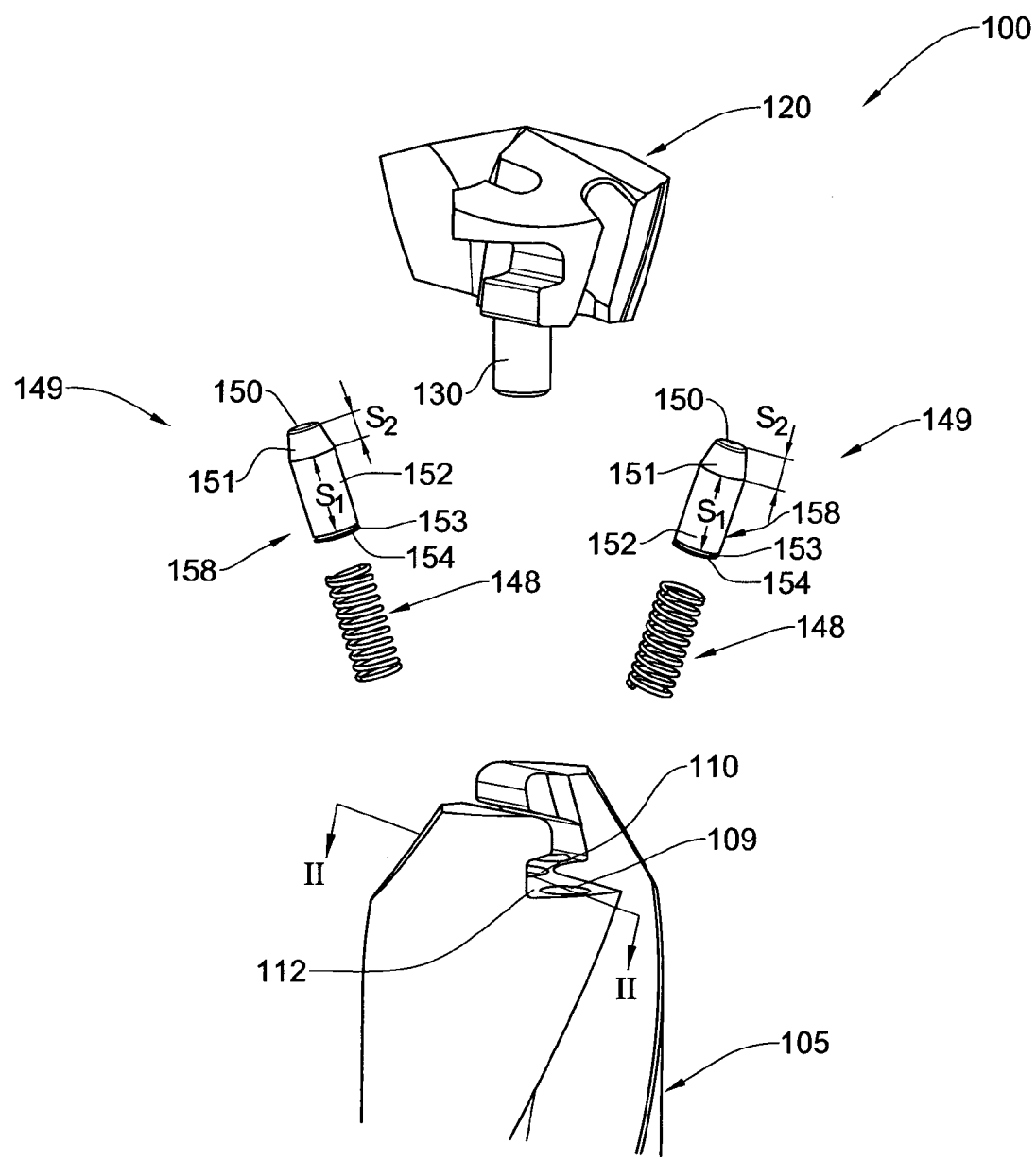
FIG. 4A is a schematic exploded view of the assembly shown in FIG. 1.
Figure 4B:
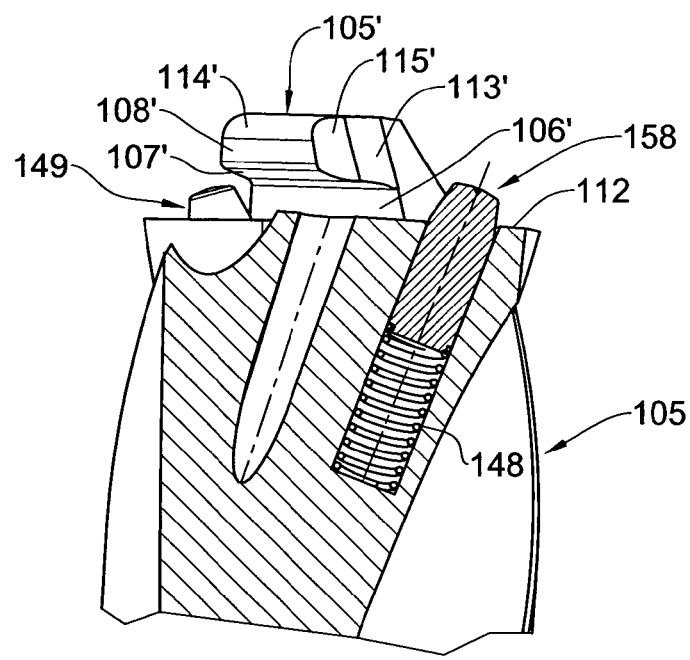
FIG. 4B is a schematic cross-sectional view of a tool holder and securing mechanism assembly taken along line II-II lying on a plane containing the central axis of the cutting tool shown in FIG. 4A.

The mounting portion 120' of the cutting insert contains a shank 130, designed to interface with securing hole 110 for aligning the central axis 160' of insert 120 to the central axis 160 of tool holder 105, and two identical mounting features interfacing with securing mechanism 149 and mounting features 105' (FIGS. 4A and 4B).

The shank is centered on the axis of rotation 160', perpendicular to and in contact with the insert bottom surface 131 having a bottom circumference $c_1$ from which extends a circumferential surface 135, at an acute angle to the axis of rotation 160', to a height h.

The mounting features are each formed with a wall portion W and a latch portion L, which are defined by the following surfaces:
- Arresting surfaces 134', designed for providing the mechanical stops for securing mechanism 149, extending from the circular edges 157' and contacting securing surfaces 133', 134' and bottom surface 131, and forming extensions to channels 127';
- a First securing surfaces 133' extending from the straight edges 155', perpendicular to and intersecting insert bottom surface 131;
- Second securing surfaces 132' extending from the straight edges 156' and located opposite straight edges 155', perpendicular to and intersecting insert bottom surface 131; and
- Channels 127' of depth w, measured from circumferential surface 135 towards the axis of rotation 160' and extending from surface 124' towards the insert bottom surface 131 but not in contact with insert bottom surface 131;
- Cooling channel extensions 125', designed for providing the cutting insert 120 with access to cooling liquid from channels 111', extending from top surfaces 124' to insert bottom surface 131 and intersect insert bottom surface 131, when cutting insert 120 is assembled to tool holder 105. The cooling channel extensions 125' are aligned to cooling liquid channels 111'(see FIG. 2A).
- Insert alignment surfaces 136', designed for interfacing with corresponding surfaces contained in securing extensions 105" and aiding in the assembly thereof to tool holder 105, bounded by cooling channel extensions 125' respectively and circumferential surface 135, in contact with and perpendicular to insert bottom surface 131;

Contact surfaces 137', adapted for mating with corresponding surfaces contained in securing extensions 105", bounded by cooling channel extensions 125' and circumferential surface 135, in contact with and at an oblique angle to insert alignment surfaces 136';

Alignment surfaces 138', adapted for interfacing with corresponding surfaces contained in securing extensions 105" and aiding in the assembly thereof to tool holder 105. The alignment surfaces extend from and at an oblique angle to contact surfaces 137', and bounded by cooling channel extensions 125' and circumferential surface 135; and Curved surfaces 139', designed to be aligned to but not in contact with, surfaces 114', extending from alignment surfaces 138' and bounded by cooling channel extensions 125' and circumferential surface 135;

The cutting portion 120" of cutting insert 120 is formed with:

a First top Surfaces 124' and relief surface 126' (serving as a relief surface), intersecting each other and circumferential surface 135, oriented at an acute angle to the insert bottom surface 131, form a sharp tip at the top of the cutting insert and enclose a solid volume of conical shape whose top circumference $c_2$ is larger than the bottom circumference $c_1$;

Chip directing Surfaces 141' are curved surfaces, matching the profile and aligned with chip evacuation channel 103, extending from the insert bottom surface 131 up to the relief surface 126', their intersection forms the cutting edges 123'; and Triangular surfaces 128' and 129', intersect each other at their base at an acute angle and intersect, at oblique angles chip directing surface 141', the intersection of triangular surfaces 129' with the relief surface 126' form cutting edges 122'.

With reference to FIG. 4A there is shown an exploded assembly of cutting tool 100, particularly securing mechanism 149 composed of a compression spring 148 and a cylindrical pin 158.

The cylindrical pin 158 is formed with:

Bottom pin surface 154;

Groove 153 located in close proximity to bottom pin surface 154;

Cylindrical surface 152 extending to a height $s_1$ from the outer diameter of groove 153;

Conical surface 151 extending to height $s_2$ from cylindrical surface 152; and

Figure 4C:
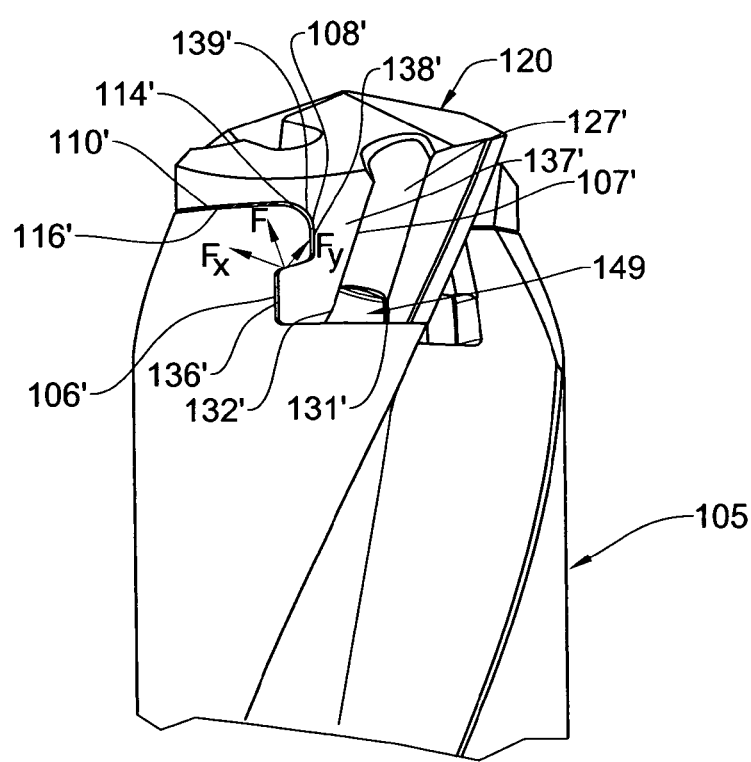
FIG. 4C is a schematic perspective view of a cutting insert in the mounted in position on the tool holder shown in FIG. 2A.
Figure 5:
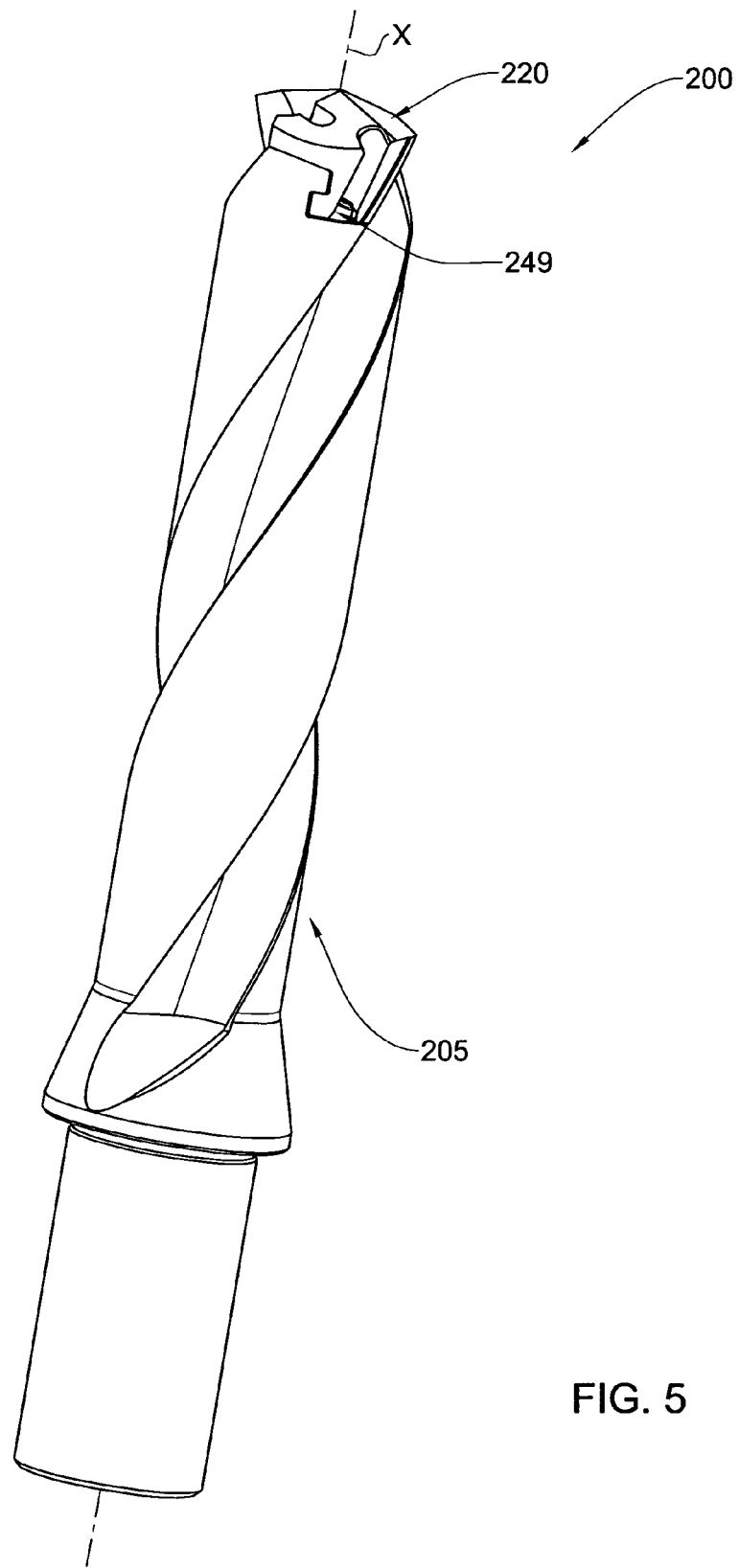
FIG. 5 is a schematic perspective view of a second example of a cutting tool assembly.

Top pin surface 150 in contact with conical surface 151 and parallel to bottom pin surface 154;

With reference to FIG. 4A to 4C, in assembly, the first and second coils 148 is introduced into respective grooves 153 of pin 158 to form the securing mechanism, and the two assembled securing mechanisms are then inserted into holes 109'. The depth of pin holes 109' allows the conical surface 151 of pin 158 to protrude out of insert seat surface 112.

In order to mount cutting insert 120 into the tool holder 105, shank 130 is aligned with and inserted into alignment hole 110. At the same time, insert bottom surface 131 is aligned with top pin surface 150. In order to assume the secured position, the cutting insert 120 is required to rotate. However such rotation is prevented by the protruding cylindrical pins 158. Therefore, the cylindrical pins 158 are required to be depressed. One way of depressing them would be with the bottom surface 131, more particularly, applying pressure on the cutting insert 120 along the axial direction so as to depress the securing pins 158.

Pressing down on insert 120 and as result on pin 158 as well, entails compression by spring 148 until insert bottom surface 131 comes in contact with insert seat surface 112. In this position, turning the insert 120 in the clockwise direction towards the securing extensions 105" will align channels 127' with pins 158 and release the springs 148 from it's compressed state pushing pins 158 into channels 127' and creating a tight contact between the conical surface 151 and securing surfaces 132', 133' and arresting surfaces 134', in addition, turning the insert 120 in the clockwise direction will align securing extensions 105" with mounting portion 120', the contact combined with the force of springs 148 pushes on the insert 120 creating a tight contact between contact surfaces 107' and 137' thus completing the assembly of tool 100.

In the secured position, the latch portions L of the cutting insert 120 and of the mounting portion of the cutting tool holder 105 respectively are engaged with one another, further preventing displacement of the cutting insert 120 in the axial direction (along axis 160).

The operation mechanism of the biased securing pin 250 is generally similar to that disclosed in U.S. patent application Ser. No. 12/314,428 to the applicant, which is incorporated herein by reference, in particular, the portions of the specification of the above application pertaining to FIGS. 2A to 44, FIGS. 47 to 49C and FIGS. 59A to 66B therein.

When mounted, due to the engagement between the cutting insert and the cutting tool holder at contact surfaces 107' and 137' the force applied by the securing pins onto the cutting insert results in a composite force F which attempts to separate the securing extensions 105" from tool holder 105. More particularly, it attempts to 'widen' the pocket of the tool holder so as to push apart the under surface 107' from the seat surface 131.

In operation of the drilling tool, engagement with the workpiece is via cutting edges 122', 123', penetrating into the workpiece and removing a chip therefrom which is channeled along surfaces 141' and into the chip evacuation channel 103, to then be discarded. During operation, the composite force F is increased tenfold and as a result component $F_x$ acts on securing extensions 105" attempting to bend the securing extensions 105" away from the tool holder 105, i.e. bend the latch portion L of the cutting tool holder to assume an obtuse angle with respect to the wall portion W of the cutting tool holder.

With reference to FIGS. 1, 3B and 4C, in operation cutting tool 100 is secured in a drilling machine head (not shown) via tool shank 102, turning the entire assembly of cutting tool 100 at high rotational speeds in a clockwise direction, the drilling head with cutting tool 100 contained therein is moved perpendicularly towards a workpiece in order to create a hole in the workpiece.

Once the operation is complete, the cutting tool 100 is turned in a counter clockwise direction in order to release the cutting tool from the workpiece thus creating a composite force smaller than the above mentioned composite force but in the opposite direction attempting to pull surfaces 107' and 137' apart, this is countered by securing mechanism 149 keeping the insert 120 from disengaging the cutting tool holder 105.

In order to disengage the cutting insert 120 from tool holder 105 it is necessary to depress pins 158, thereby allowing turning cutting insert 120 in the counter clockwise direction away from securing extensions 105". Such depression can be performed by a specially designed tool (not shown) having two extensions adapted for simultaneously depressing the securing pin.

With reference to FIG. 5 to 8C, there will now be described another cutting tool 200 also configured for drilling purposes.

For purpose of convenience, elements in the cutting tool 200 which are similar to elements of the cutting tool 100 were designated with the same designation number, but upped by 100 (e.g. cutting tool holder 205 of cutting tool 200 is similar to cutting tool holder 105 of cutting tool 100).

Figure 6A:
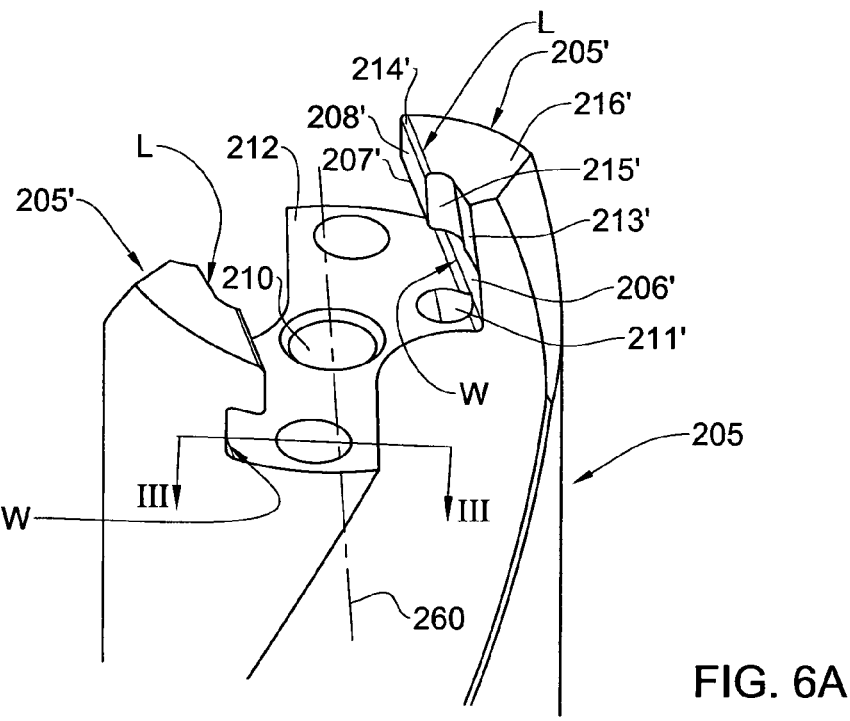
FIG. 6A is a schematic top view of a tool holder shown in FIG. 5.
Figure 6B:
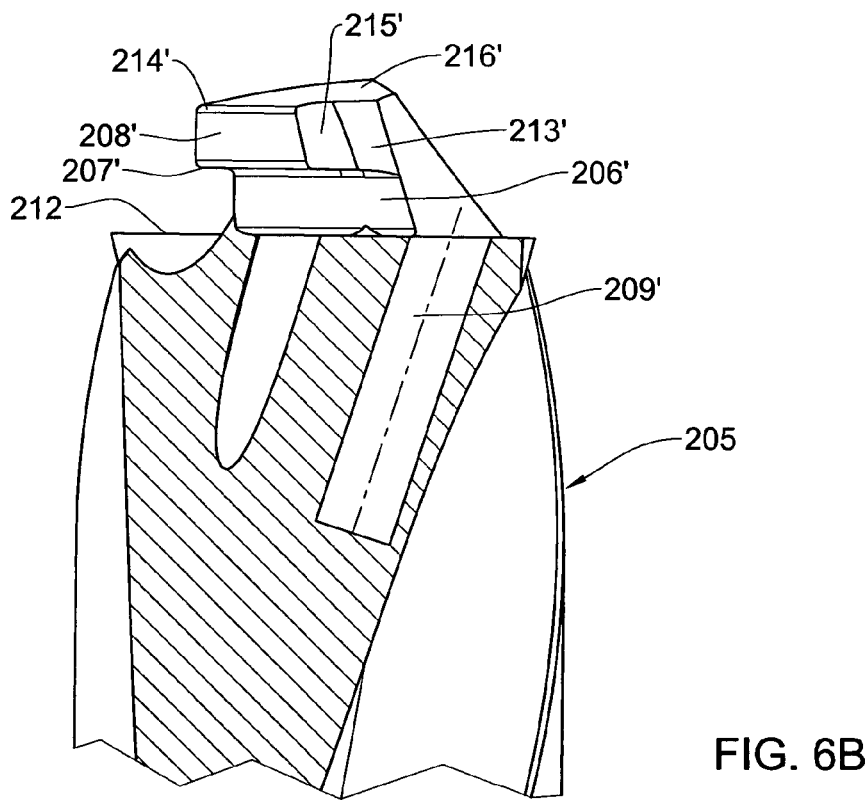
FIG. 6B is a schematic cross-sectional view of the tool holder with respect to line III-III lying on a plane parallel to the central axis of the cutting tool and at a distance R from the central axis, shown in FIG. 6A.
Figure 7A:
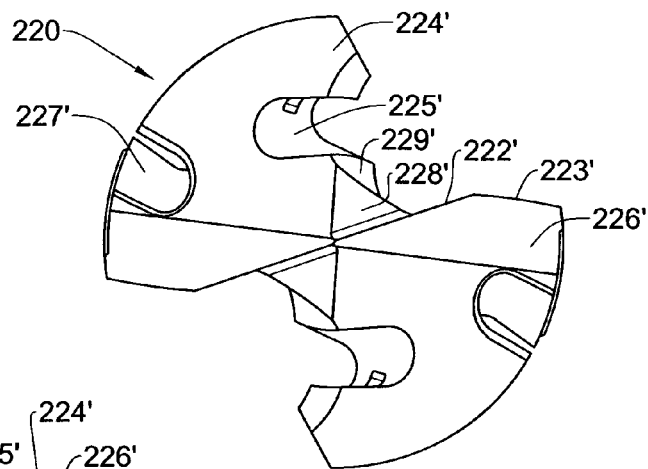
FIG. 7A is a schematic top view of an insert according shown in FIG. 5.
Figure 7B:
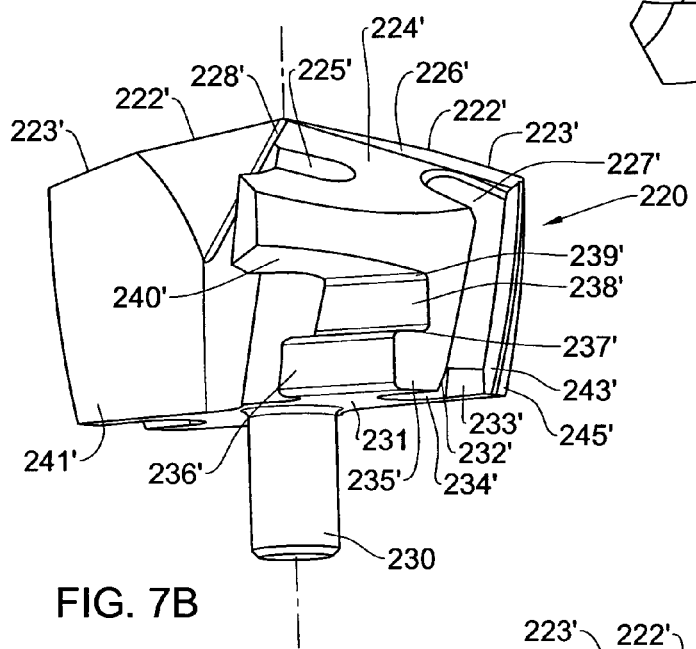
FIG. 7B is a schematic perspective view of a cutting insert shown in FIG. 6A.
Figure 7C:
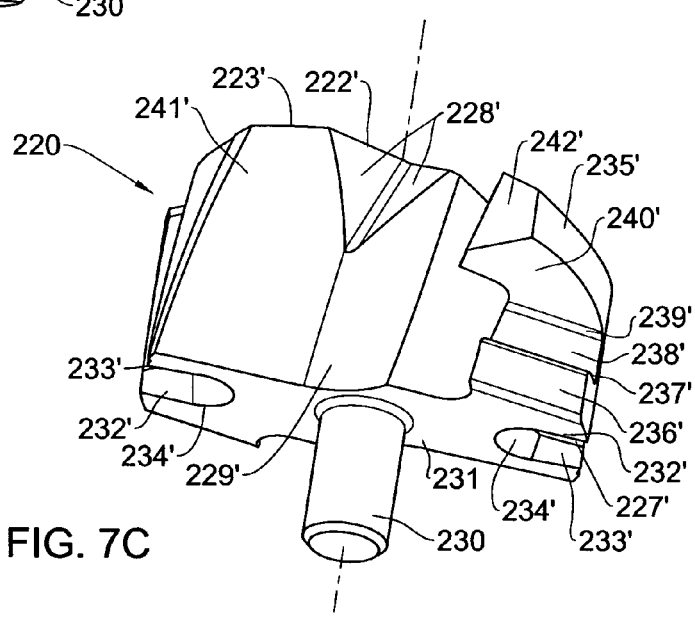
FIG. 7C is a schematic perspective bottom view of the cutting insert shown in FIG. 6A.
Figure 8A:
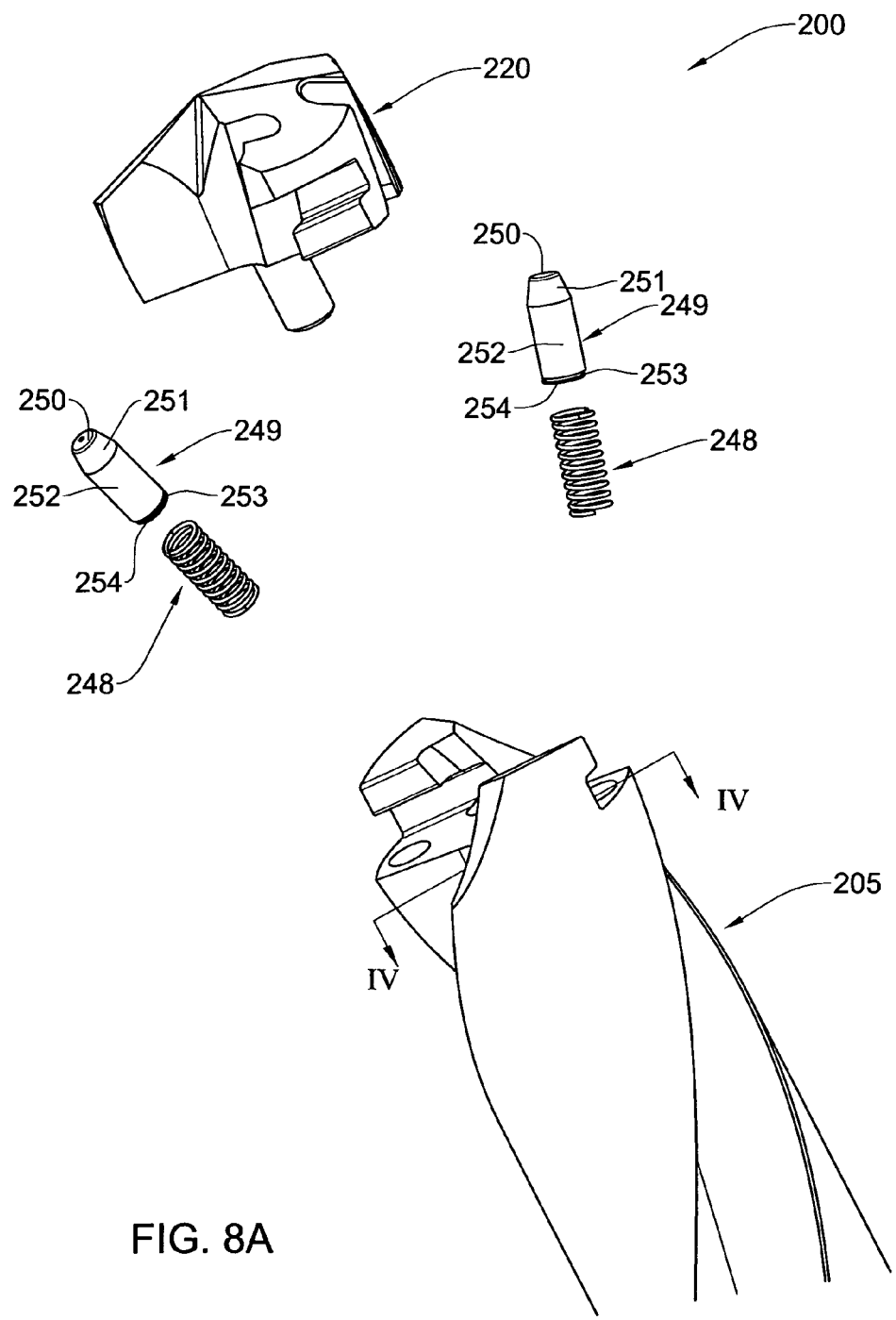
FIG. 8A is schematic exploded view of an assembly shown in FIG. 5.
Figure 8B:
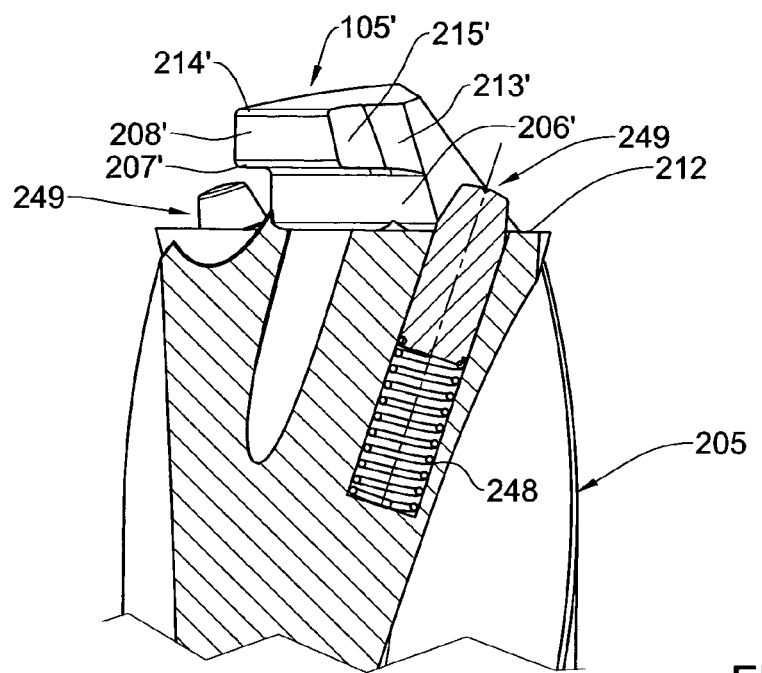
FIG. 8B is a schematic cross-sectional view of the tool holder with respect to line IV-IV lying on a plane containing the central axis of the cutting tool shown in FIG. 8A.
Figure 8C:
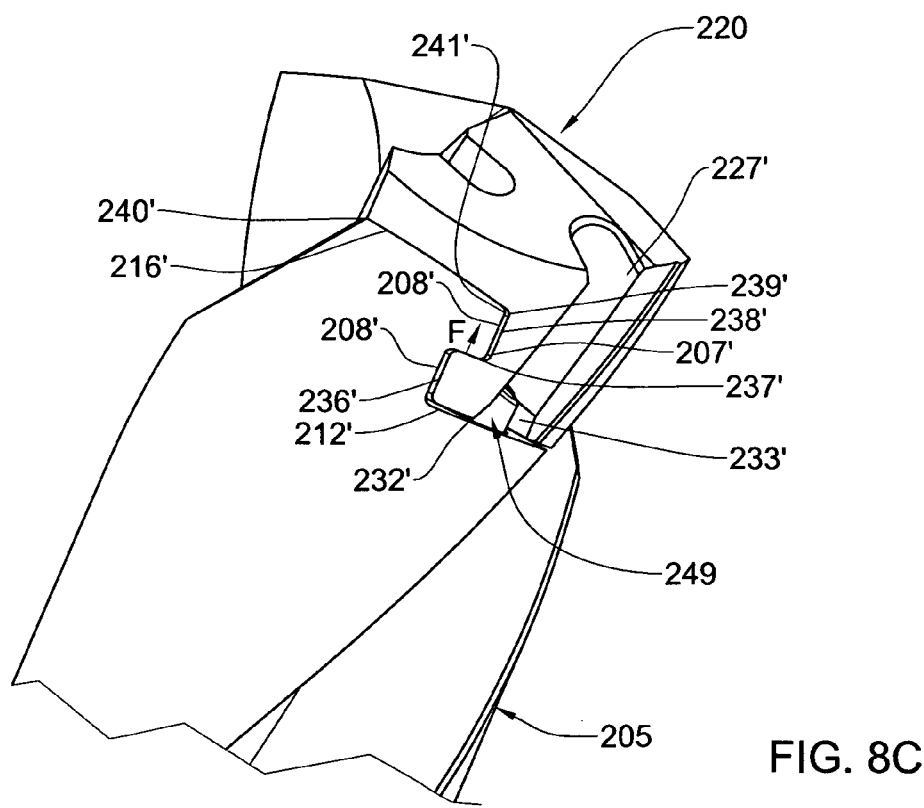
FIG. 8C is a schematic perspective view of a cutting insert in a mounted position on the tool holder shown in FIG. 6A.
Figure 9:
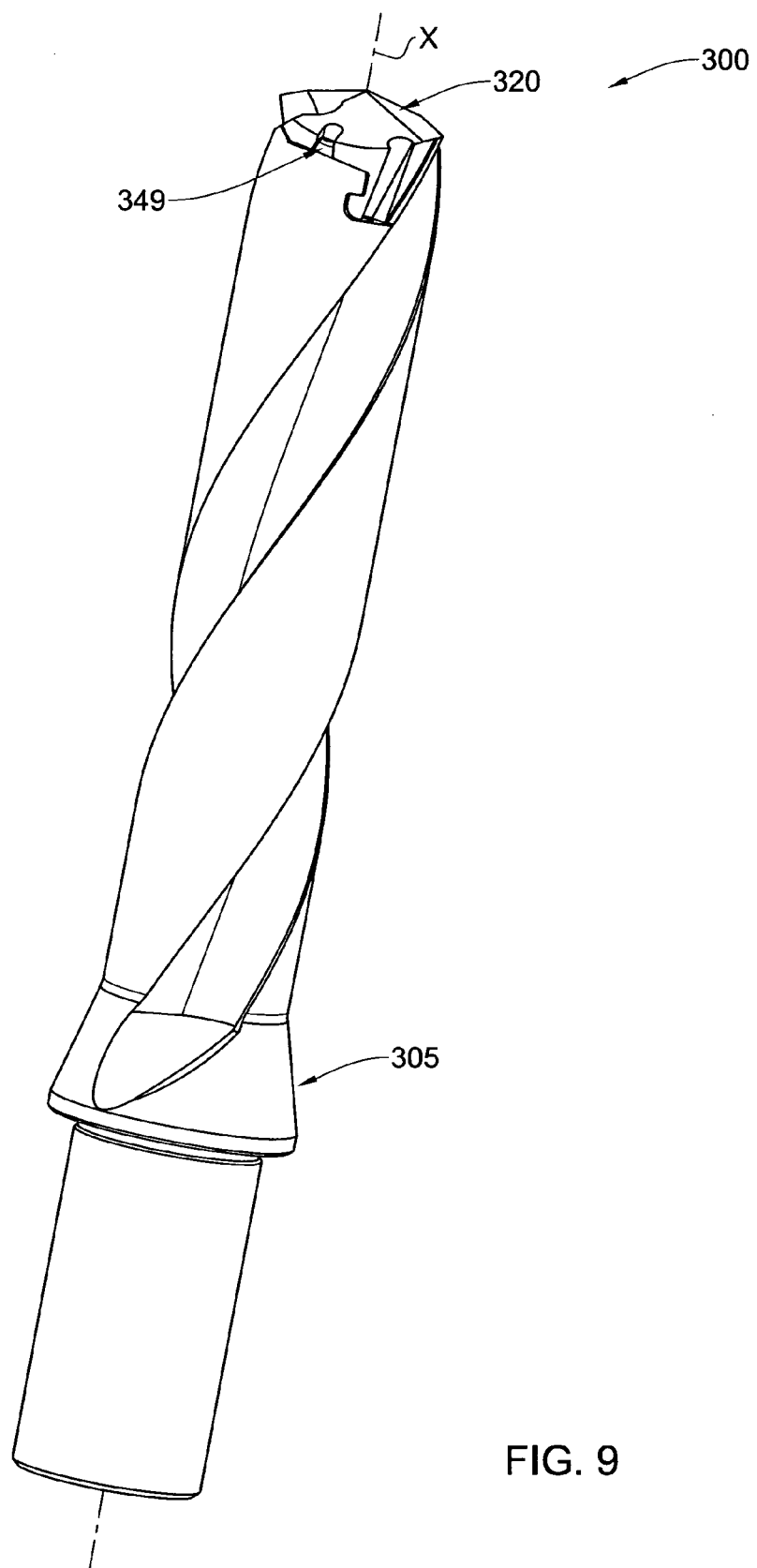
FIG. 9 is a schematic perspective view of a third example of a cutting tool assembly.

With reference to FIGS. 6A and 6B it is noted that the latch portion L is now essentially perpendicular to the wall portion W of the extension 205". In particular, contact surfaces 207' are now parallel to insert seat surface 212, where in the previous embodiment they were at an oblique angle to the insert seat surface and contact surfaces 237' are now perpendicular to insert alignment surfaces 236' and also perpendicular to alignment surfaces 238', where in the previous embodiment they were at an oblique angle to said surfaces.

The surfaces are also referenced as follows:
240'—insert under surface;
238'—insert side surface'
237'—bayonet top surface';
236'—bayonet side surface; and
231—bayonet bottom surface.

In operation this difference eliminates the formation of the composite force described in the previous embodiment and creates an alternative direct force acting parallel to the axis of rotation 260, pressing contact surfaces 207' and 237', the advantage being that now the load is no longer a composite force but a single load acting in a direction which does not cause the securing extensions 205" to separate, thus ensuring longer lifespan of the cutting tool.

More specifically, the insert bottom surface 240' presses on the top surface 216' of the latch portion, and the bayonet top surface 237' presses in an almost opposite direction on the latch under surface 207' (denoted by F and F'). Additionally, the securing mechanism applies a force T on the cutting insert, pressing it against the pocket of the latch and increasing the forces F, F'.

Thus, as opposed to the previously described example, instead of attempting to 'widen' the pocket of the latch, thereby possibly damaging the mechanical integrity of the tool holder in the long run, the forces applied by the cutting insert in this design simply press on the latch from both ways, attempting to 'squeeze' it.

In assembly, upper contact surfaces 240' and upper surfaces 216' are in tight contact with each other, in addition to the tight contact between contact surfaces 207' and 237', this lends additional robustness to the assembly during operation.

In this configuration, there is no contact between bottom surface 231 and insert seat surface 212.

With reference to FIG. 9 to 12C there will now be described another cutting tool 300 also configured for drilling purposes.

For purpose of convenience, elements in the cutting tool 300 which are similar to elements of the cutting tool 200 were designated with the same designation number, but upped by 100 (e.g. cutting tool holder 305 of cutting tool 300 is similar to cutting tool holder 205 of cutting tool 200).

Figure 10B:
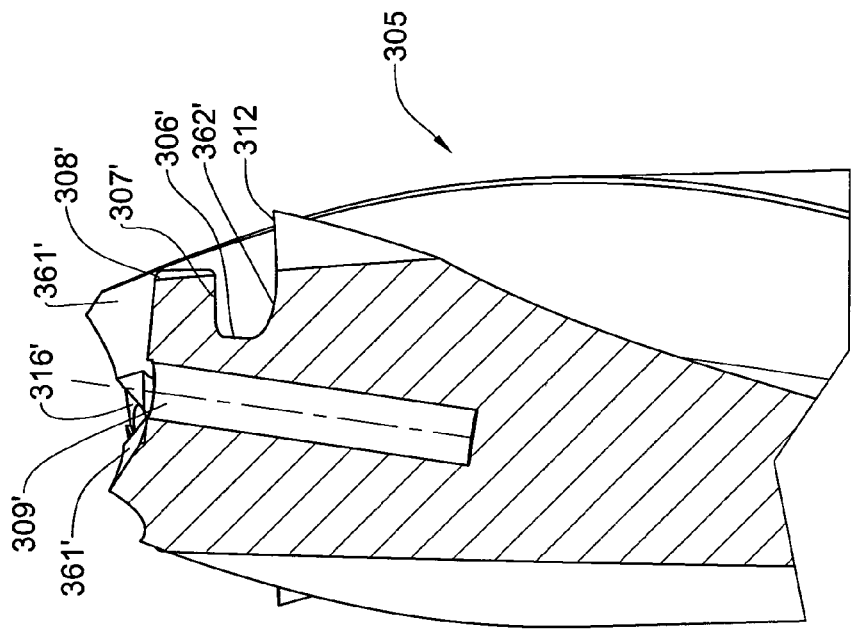
FIG. 10B is a schematic cross-sectional view of the tool holder with respect to line V-V lying on plane parallel to the central axis shown in FIG. 10A.
Figure 10A:
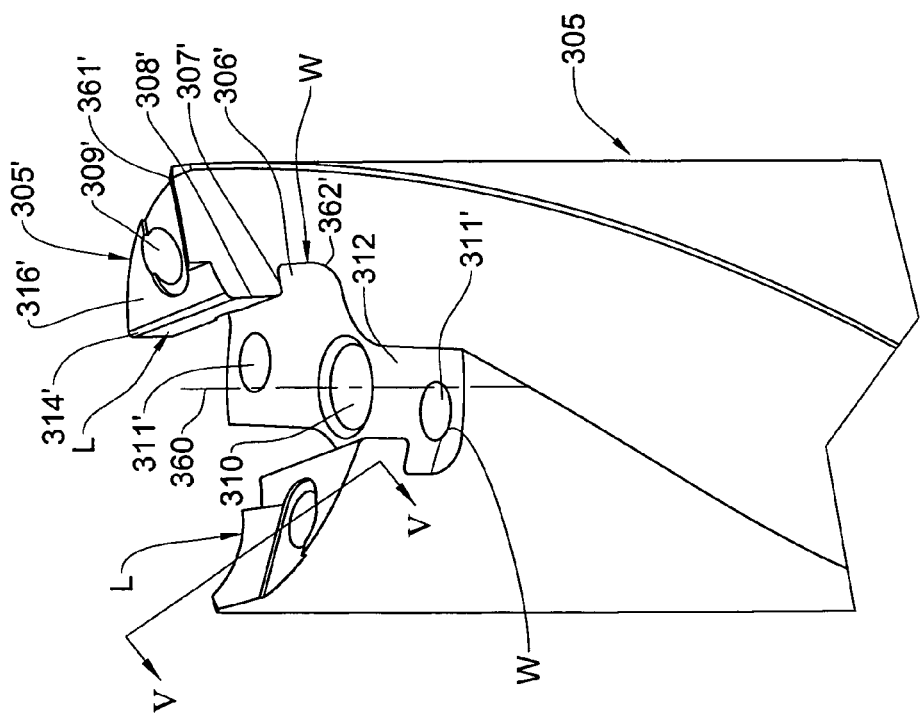
FIG. 10A is a schematic top view of a tool holder shown in FIG. 9.

With reference to FIGS. 10A and 10B, pin holes 309' are located on the upper surface 316' of the mounting portion 305', and cooling liquid holes 311' have been relocated to the positions of pin holes 109', described in the first embodiment. In other words, the securing pin is now received within the latch portion L of the mounting portion of the cutting tool holder 305, rather than being received within the insert seat of the cutting tool holder 305. Thus, the securing pin protrudes from the surface 316' rather than from the surface 312.

Figure 11A:
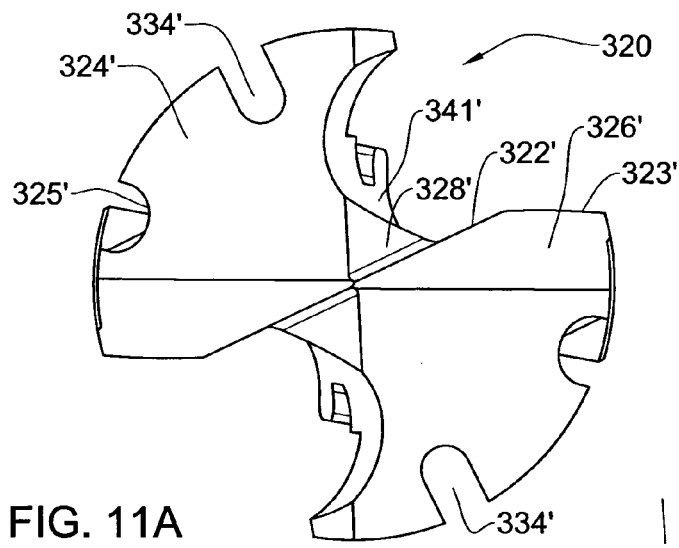
FIG. 11A is a schematic top view of an insert shown in FIG. 9.
Figure 11B:
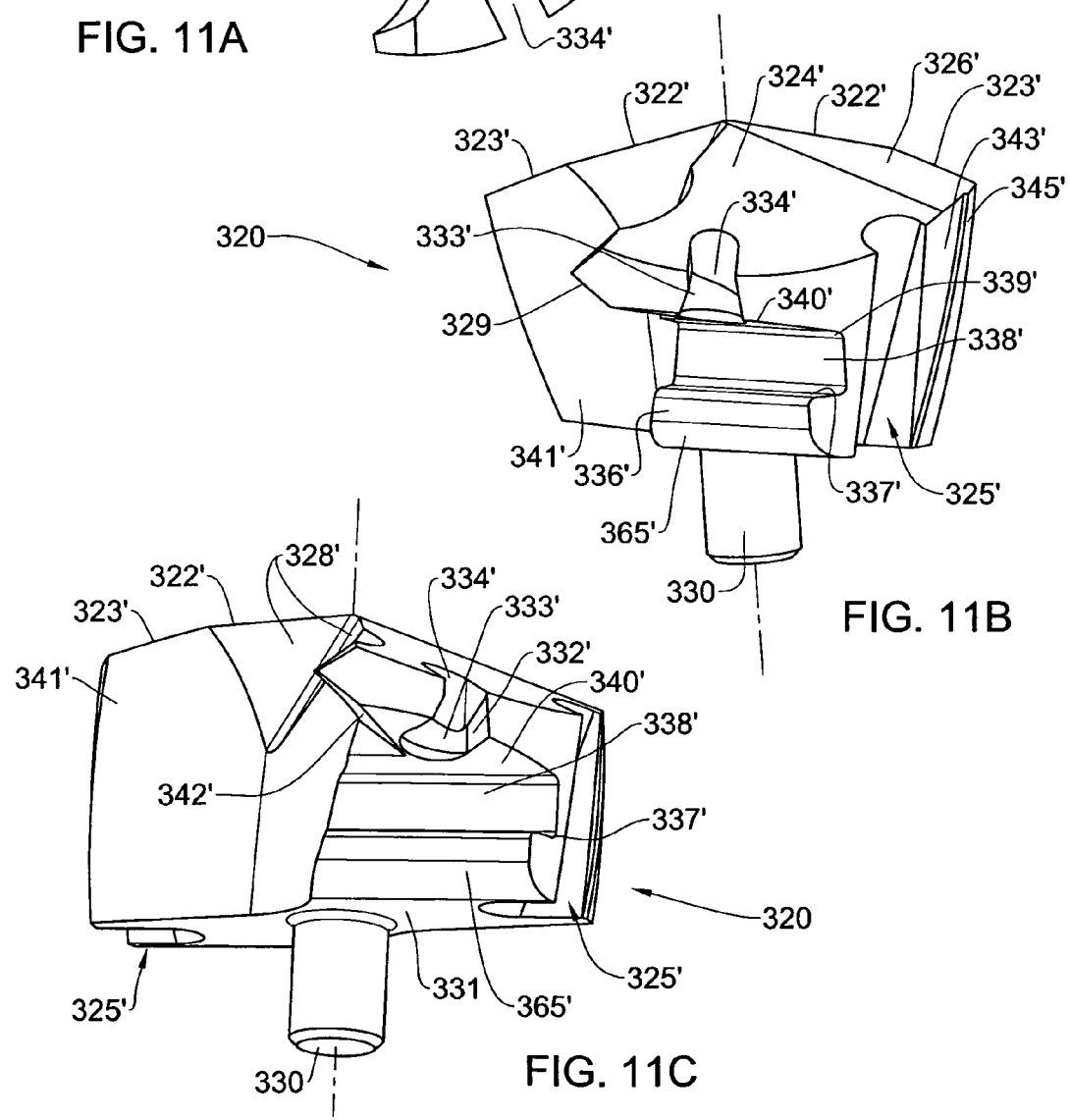
FIG. 11B is schematic perspective view of a cutting insert shown in FIG. 11A.
Figure 11C:
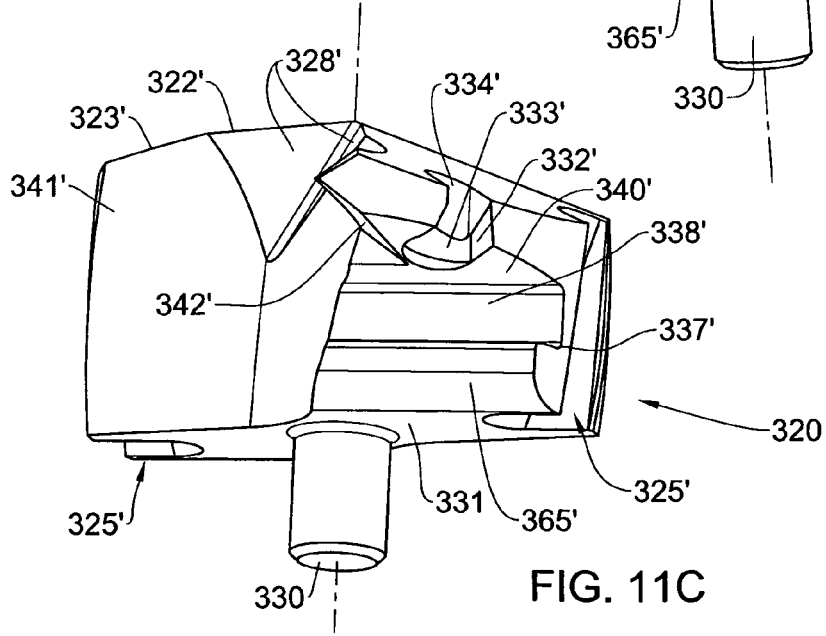
FIG. 11C is a schematic perspective bottom view of a cutting insert shown in FIG. 11A.

With reference to FIG. 11A to 11C, cooling channel extensions 325' have been relocated to the positions of extension channels 127', described in the first embodiment, and are now aligned with cooling liquid holes 311'.

Securing surfaces 333' extend from surfaces 324' to upper contact surfaces 340' and are aligned with pin holes 309'.

Figure 12A:
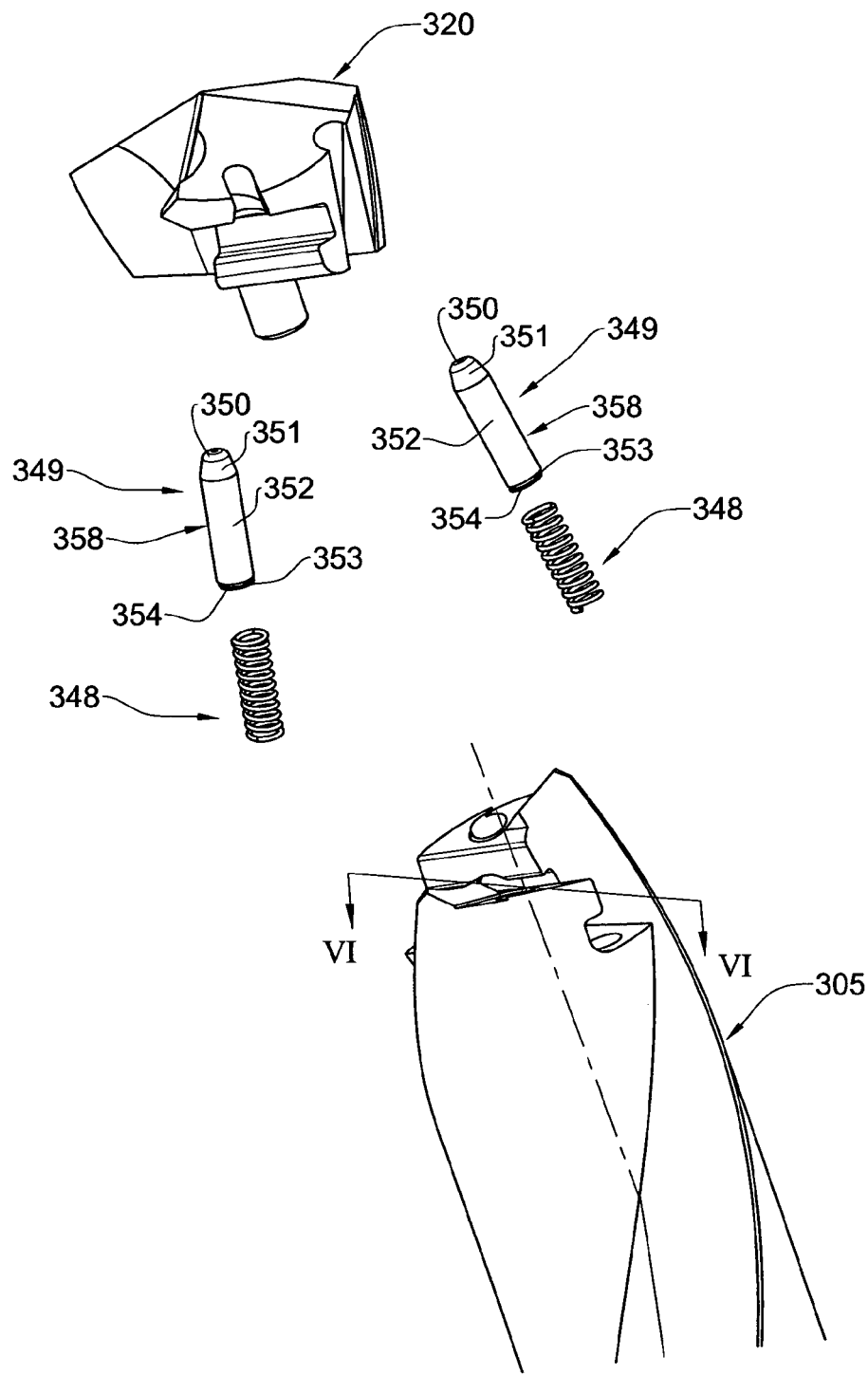
FIG. 12A is schematic exploded view of an assembly shown in FIG. 9.
Figure 12B:
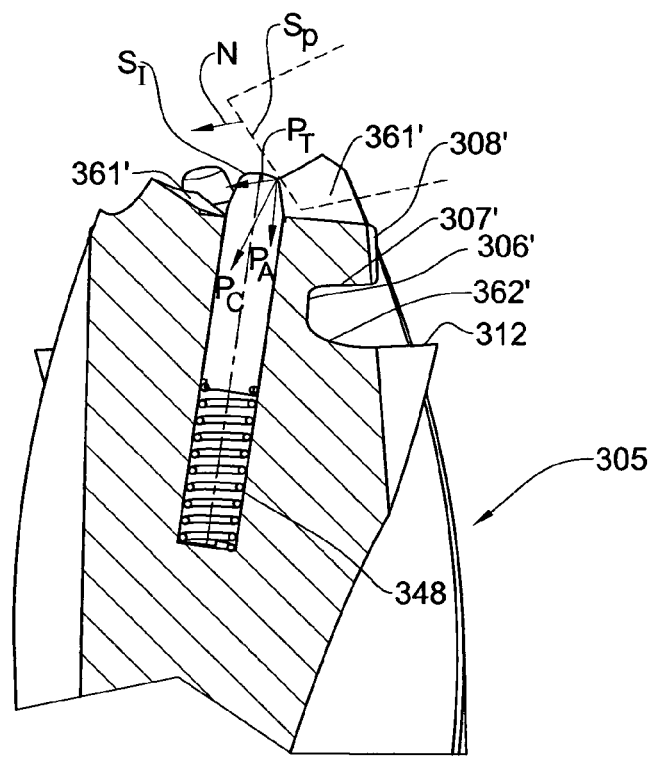
FIG. 12B is a schematic cross-sectional view of the tool holder with respect to line VI-VI lying on a plane parallel to the central axis of the cutting tool shown in FIG. 12A.
Figure 12C:
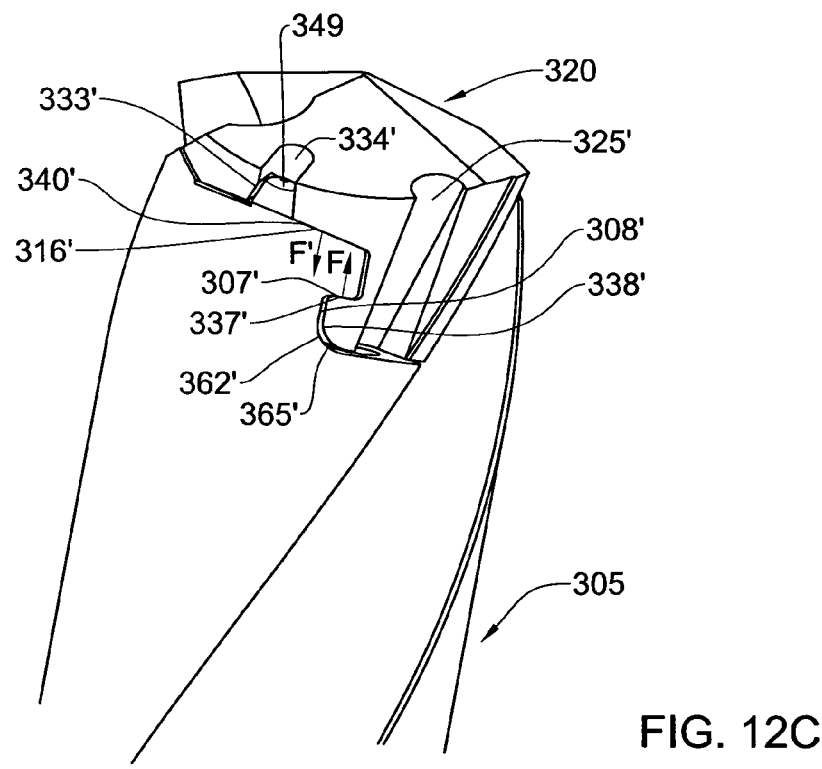
FIG. 12C is a schematic perspective view of a cutting insert in the mounted position on the tool holder shown in FIG. 10A.

With reference to FIG. 12A to 12C, in assembly the securing mechanism 349, similar to securing mechanism 249 and 149, is now placed in pin holes 309' and allows the conical surface 351 of pin 358 to protrude from upper surface 316' and engage securing surfaces 333', 334', thus securing the insert 320.

With particular attention being drawn to FIG. 12B, a portion of the cutting insert 320 is shown in phantom lines during mounting of the cutting insert 320 onto the cutting tool holder 305. It is observed that the cutting insert 320 is formed with a pin engagement surface $S_P$ which is oriented at an angle to the upper seat surface 316', and the securing pin 358 is formed with an insert engaging surface $S_I$ (constituted by the filleted portion 351), adapted to come in contact with one another during mounting of the cutting insert.

During mounting of the cutting insert 320 onto the cutting tool holder 305, the shank 330 of the cutting insert 320 is inserted into the hole 310 of the cutting tool holder 305. From this position, the cutting insert 320 is rotated until the pin engagement surface $S_p$ thereof comes in contact with the insert engagement surface $S_I$, when the securing pin 358 is in its securing position (i.e. protruding from the surface 316' of the cutting tool holder 305).

Further rotating the cutting insert 320 (generally parallel to the surface 316') entails the application of a composite force $P_C$ on the securing pin 358, having a first, axial component $P_A$ and a second, transverse component $P_T$. Due to the angle between the pin engagement surface $S_P$, the axial force component $P_A$ is greater than transverse force component $P_T$, which entails the retraction of the securing pin 358 into the pin hole 311', i.e. from a securing position to a mounting position.

Thus, during the above rotation, the securing pin 358 retracts and allows the cutting insert 320 to continue its rotation about the central axis 360 until the securing pins 358 are aligned with the openings 325', in which position the securing pins 358 can displace into these openings.

The advantage of this type of construction on the previously described cutting tools is that when assembling the insert 320 to tool holder 305 it is no longer required perform two motions in order to mount the cutting insert. In particular, whereas in the previously described cutting tools it was required to perform a first motion in which the cutting insert is positioned such that the bottom surface 331 thereof engages the cylindrical pin 358 and pressing down on the pin 358, and thereafter a second motion in which the cutting insert 320 is rotated about the central axis 360 to its secured position, in the present example, a single unidirectional motion allows mounting the cutting insert 320 onto the cutting tool holder 305 by.

In this embodiment the rotation of the insert will cause upper contact surfaces 340' to ride on top of the pins until they engage securing surfaces 333', 334', at which point the rotation is no longer possible.

Figure 13A:
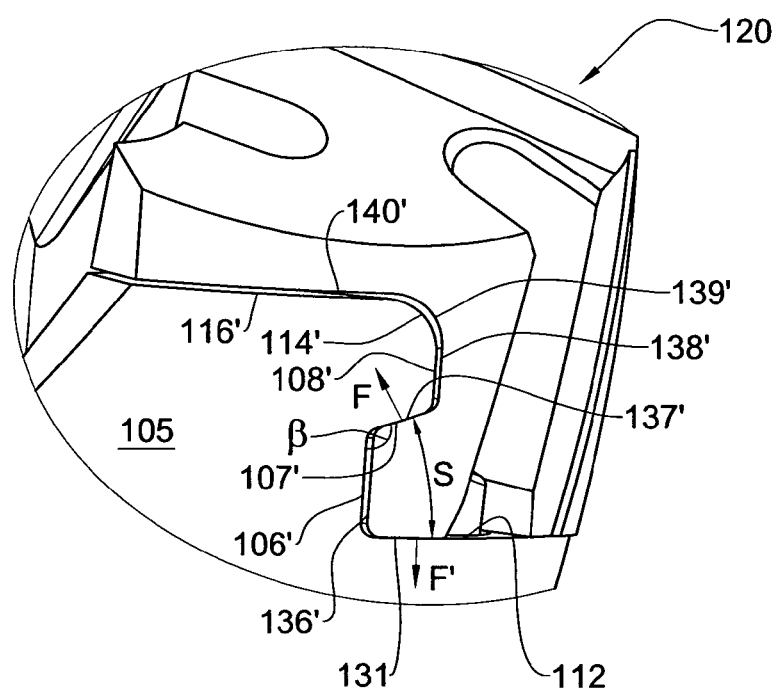
FIG. 13A, FIG. 13B and FIG. 13C are schematic enlarged views of the respective cutting tools shown in FIGS. 1A, 5 and 9.
Figure 13B:
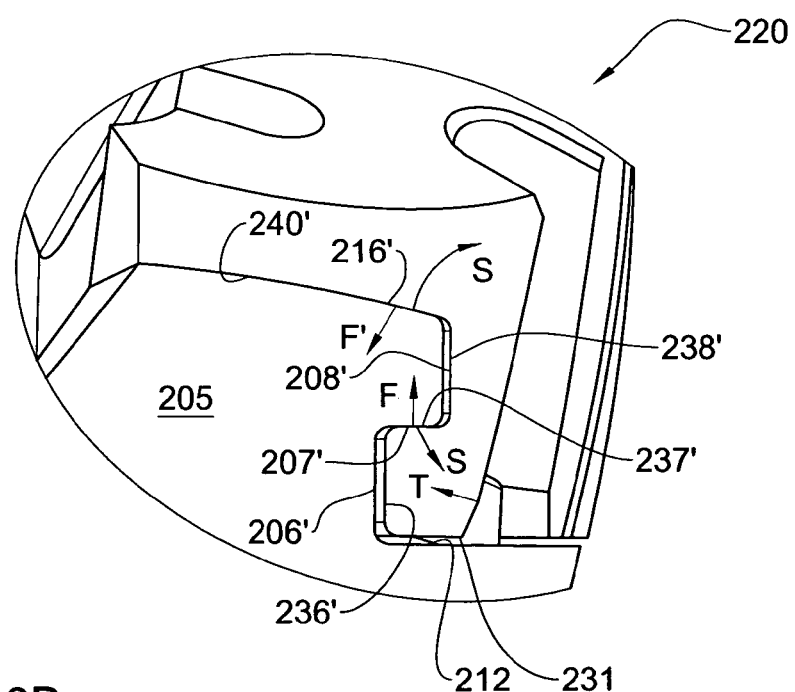
Figure 13C:
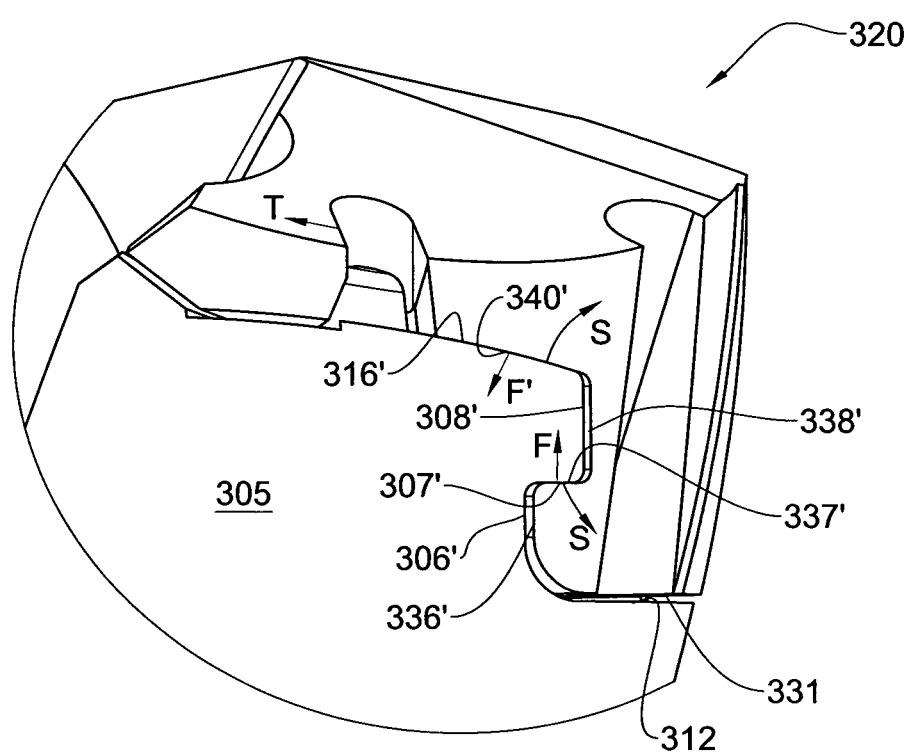

With reference to FIGS. 13A, 13B and 13C, the difference between the three drilling tools described above is shown, with the difference forces F, F' and T and the respective areas in which they are applied.

Those skilled in the art to which this invention pertains will readily appreciate that numerous changes, variations and modifications can be made without departing from the scope of the invention mutatis mutandis.

The invention claimed is:

1. A cutting tool holder configured for mounting thereon a cutting insert to form a cutting tool, the tool holder extending along a central axis and comprising:
    a mounting portion having a seat surface oriented generally perpendicular to the central axis; and
    at least two securing extensions projecting from the seat surface in a direction generally parallel to that of the central axis,
    each of the extensions being formed, at an end remote from the seat surface with a latch portion extending towards the central axis,
    the latch portion having an under surface and a top surface, the top surface configured for receiving thereon a portion of the cutting insert and which does not constitute an end surface of the cutting tool, both surfaces being oriented generally transversely to the central axis such that the under surface is disposed between the seat surface and the top surface,
    each of the extensions being further formed with a side surface extending between the under surface and the seat surface to form a securing pocket defined between the seat surface, the side surface and the under surface, configured for receiving therein a portion of the cutting insert,
    wherein the under surface is oriented parallel to the seat surface and the top surface is oriented at an angle to the side surface other than 90 deg.

2. A cutting tool holder according to claim 1, wherein at least one of the seat surface and the under surface are oriented at a generally right angle to the side surface.

3. A cutting tool holder according to claim 1, wherein both the seat surface and the under surface are oriented at a generally right angle to the side surface.

4. A cutting tool holder according to claim 1, wherein the area of the top surface is considerably greater than the area of the under surface.

5. A cutting tool holder according to claim 1, wherein the latch portion is further formed with an auxiliary side surface extending between the under surface and the top surface.

6. A cutting tool holder according to claim 5, wherein the auxiliary side surface is oriented generally parallel to the side surface.

7. A cutting tool holder according to claim 6, wherein the cutting tool holder is further formed with a securing port, configured for receiving therein at least a part of a securing mechanism configured for securing the cutting insert onto the cutting tool holder, when the former is mounted onto the latter.

8. A cutting tool holder according to claim 7, wherein the securing mechanism is configured for applying a force to the cutting insert urging it into the mounting position by pressing it against the cutting tool holder.

9. A cutting tool holder according to claim 8, wherein the force applied by the securing mechanism is configured for tightening the contact between the corresponding surfaces of the cutting insert and the respective top surface and under surface of the latch portion.

10. A cutting tool holder according to claim 8, wherein the securing mechanism is a no screw mechanism.

11. A cutting tool holder according to claim 8, wherein the securing port of the cutting tool holder is formed within the seat surface thereof such that when the insert is mounted onto the holder, a bayonet portion of the cutting insert is disposed between the latch portion of the cutting tool holder and the securing mechanism.

12. A cutting tool holder according to claim 8, wherein the securing port of the cutting tool holder is formed within the top surface thereof such that the latch portion of the cutting tool holder is disposed between a bayonet portion of the cutting insert and the securing mechanism.

13. A cutting tool holder according to claim 1, wherein the cutting tool is used for drilling.

14. A cutting insert configured to be mounted onto a cutting tool holder to form a cutting tool, the cutting insert extends along a central axis, the cutting insert comprising:
    a mounting portion having an insert under surface oriented generally transversely to the central axis; and
    at least two securing extensions projecting from the insert under surface in a direction generally parallel to that of the central axis,
    each of the extensions being formed, at an end remote from the insert under surface with a bayonet portion extending towards the central axis,
    the bayonet portion having a bayonet top surface and a bayonet bottom surface, both surfaces oriented generally transversely to the central axis such that the bayonet top surface is disposed between the bayonet bottom surface and the insert under surface,
    each of the extensions being further formed with an insert side surface extending between the insert under surface and the bayonet top surface to form a securing pocket defined between the insert under surface, the insert side surface, and the bayonet top surface, configured for receiving therein a latch portion of the cutting tool holder,
    wherein the bayonet top surface is oriented parallel to the bayonet bottom surface and the insert under surface is oriented at an angle to the insert side surface other than 90 deg.

15. A cutting insert according to claim 14, wherein, when the cutting insert is properly aligned with the cutting tool holder, the surfaces of the mounting portions and bayonet portions of the cutting insert correspond in orientation to the surfaces of the mounting portions and latch portions of the tool holder, as follows:
    Bayonet bottom surface—oriented correspondingly to a seat surface of the tool holder;
    Bayonet side surface—oriented correspondingly to a side surface of the tool holder;
    Bayonet top surface—oriented correspondingly to an under surface of the tool holder;
    Insert side surface—oriented correspondingly to an auxiliary side surface of the tool holder; and
    Insert under surface—oriented correspondingly to a top surface of the tool holder.

16. A cutting insert according to claim 14, wherein the cutting insert is configured for coming in contact with the holder only via its bayonet top surface and insert under surface.

17. A cutting tool holder configured for mounting thereon a cutting insert to form a cutting tool, the cutting tool holder extending along a central axis and comprising:
    a mounting portion having a seat surface oriented generally perpendicular to the central axis; and
    at least two securing extensions extending in a direction generally parallel to that of the central axis,
    each of the extensions being formed, at an end remote from the seat surface with a latch portion extending towards the central axis,
    the latch portion having an under surface and a top surface, both surfaces being oriented generally transversely to the central axis such that the under surface is disposed between the seat surface and the top surface, each of the extensions being further formed with a side surface extending between the under surface and the seat surface, such that there is formed a securing pocket defined between the seat surface, side surface and under surface, configured for receiving therein a portion of the cutting insert, wherein the top surface is oriented at an angle to the side surface other than 90 deg and is formed with a securing port configured for receiving therein at least a part of a securing mechanism used for securing the cutting insert onto the cutting tool holder when the cutting insert is mounted onto the cutting tool holder.

18. A cutting tool holder according to claim 17, wherein the securing port of the cutting tool holder can be angularly offset about the central axis with respect to the pocket of the mounting portion of the cutting tool holder.

19. A drill-head configured for mounting onto the cutting tool holder of claim 17, the drill-head having a central axis being formed with a bayonet portion configured for being received within the pocket of the mounting portion of the cutting tool holder, the cutting insert further having a top surface formed with an insert securing port configured for receiving therein at least a portion of a securing mechanism, wherein the securing port is angularly offset about the central axis with respect to the bayonet portion of the drill-head.

* * * * *